United States Patent
Maclay

(10) Patent No.: US 6,328,520 B1
(45) Date of Patent: Dec. 11, 2001

(54) VEHICLE MOUNTED LARGE BALE LOADING, TRANSPORTING AND UNLOADING SYSTEM

(76) Inventor: Thomas B. Maclay, 17005 Old Hwy 93, Florence, MT (US) 59833

( * ) Notice: Subject to any disclaimer, the term of this patent is extended or adjusted under 35 U.S.C. 154(b) by 0 days.

(21) Appl. No.: 09/370,359

(22) Filed: Aug. 9, 1999

Related U.S. Application Data

(60) Provisional application No. 60/095,991, filed on Aug. 10, 1998.

(51) Int. Cl.$^7$ ........................................ B60P 1/04
(52) U.S. Cl. ..................... 414/111; 414/491; 414/514
(58) Field of Search ....................... 294/88, 106, 107; 414/111, 24.5, 24.6, 132, 789.7, 789.8, 469, 491, 492, 721, 514

(56) References Cited

U.S. PATENT DOCUMENTS

| | | |
|---|---|---|
| 2,321,168 | 6/1943 | Tognetti . |
| 2,848,127 | 8/1958 | Grey . |
| 3,348,707 | 10/1967 | Anstee . |
| 3,412,882 * | 11/1968 | Stockwell ........................ 414/469 |
| 3,788,495 | 1/1974 | Fachini et al. . |
| 3,848,758 * | 11/1974 | Carter ............................... 414/469 |
| 3,884,367 | 5/1975 | Butler et al. . |
| 3,923,176 | 12/1975 | Wynn et al. . |
| 3,942,666 | 3/1976 | Pfremmer . |
| 4,050,598 | 9/1977 | Schurz . |
| 4,067,393 | 1/1978 | Szarkowski . |
| 4,069,926 | 1/1978 | Jackson et al. . |
| 4,073,532 | 2/1978 | Blair . |
| 4,103,794 | 8/1978 | Shaw . |
| 4,227,845 | 10/1980 | Colby et al. . |
| 4,259,035 | 3/1981 | De Coene et al. . |
| 4,325,666 | 4/1982 | Chain et al. . |
| 4,370,796 | 2/1983 | Wilson . |
| 4,376,607 | 3/1983 | Gibson . |
| 4,548,535 | 10/1985 | van Die . |
| 4,594,041 | 6/1986 | Hostetler . |
| 4,911,596 | 3/1990 | Fetter . |
| 4,952,111 | 8/1990 | Callahan . |
| 5,025,992 | 6/1991 | Niebur . |
| 5,082,413 | 1/1992 | Grosz et al. . |
| 5,211,345 | 5/1993 | Siebenga . |
| 5,288,193 | 2/1994 | Warburton et al. . |
| 5,333,981 | 8/1994 | Pronovost et al. . |
| 5,340,259 | 8/1994 | Flaskey . |
| 5,405,229 | 4/1995 | Tilley et al. . |
| 5,445,490 | 8/1995 | Whitehead . |
| 5,507,612 * | 4/1996 | Siebenga ........................... 414/111 |
| 5,542,803 | 8/1996 | Driggs . |
| 5,547,334 | 8/1996 | Baril . |
| 5,607,274 | 3/1997 | Cook . |
| 5,690,461 | 11/1997 | Tilley . |
| 5,695,311 | 12/1997 | Miguel et al. . |
| 6,171,047 * | 1/2001 | Vandervalk ................. 414/111 X |

FOREIGN PATENT DOCUMENTS

| | | |
|---|---|---|
| 737495 | 1/1970 | (BE) . |
| 2 011 346 A | 7/1979 | (GB) . |
| 2273280 | 6/1994 | (GB) . |
| WO 86/07234 | 12/1986 | (WO) . |

* cited by examiner

Primary Examiner—Janice L. Krizek
(74) Attorney, Agent, or Firm—Dowrey & Associates

(57) ABSTRACT

A large bale loading, transporting and unloading method and apparatus including a wheeled vehicle having a flatbed with a longitudinal conveyor and a cross-bed conveyor for unloading bales laterally from the side of the flatbed. A tine carrying frame or bed is movable to a vertical position against a bale stack and bale engaging tines are actuated to hold the bales against the frame. The frame is returned to the horizontal position for either transport or lateral unloading. In one embodiment the longitudinal and cross-bed conveyors and the tine structures are carried on a flatbed beneath the surface thereof. In a second embodiment the longitudinal conveyor and tine structures are mounted on top of the bed. Apparatus is disclosed for selectively cuffing off flakes or segments of the bale as it is discharged laterally.

24 Claims, 14 Drawing Sheets

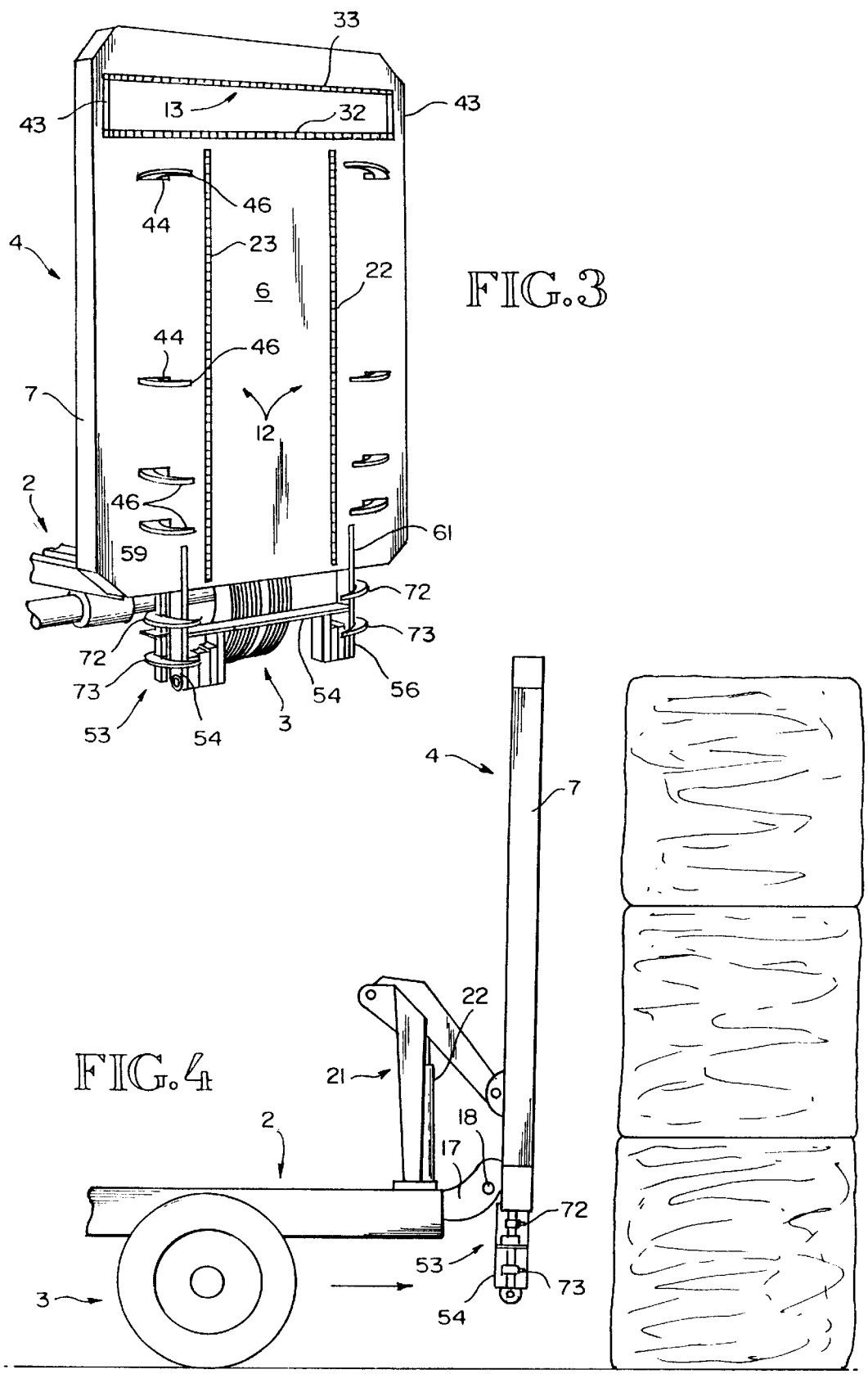

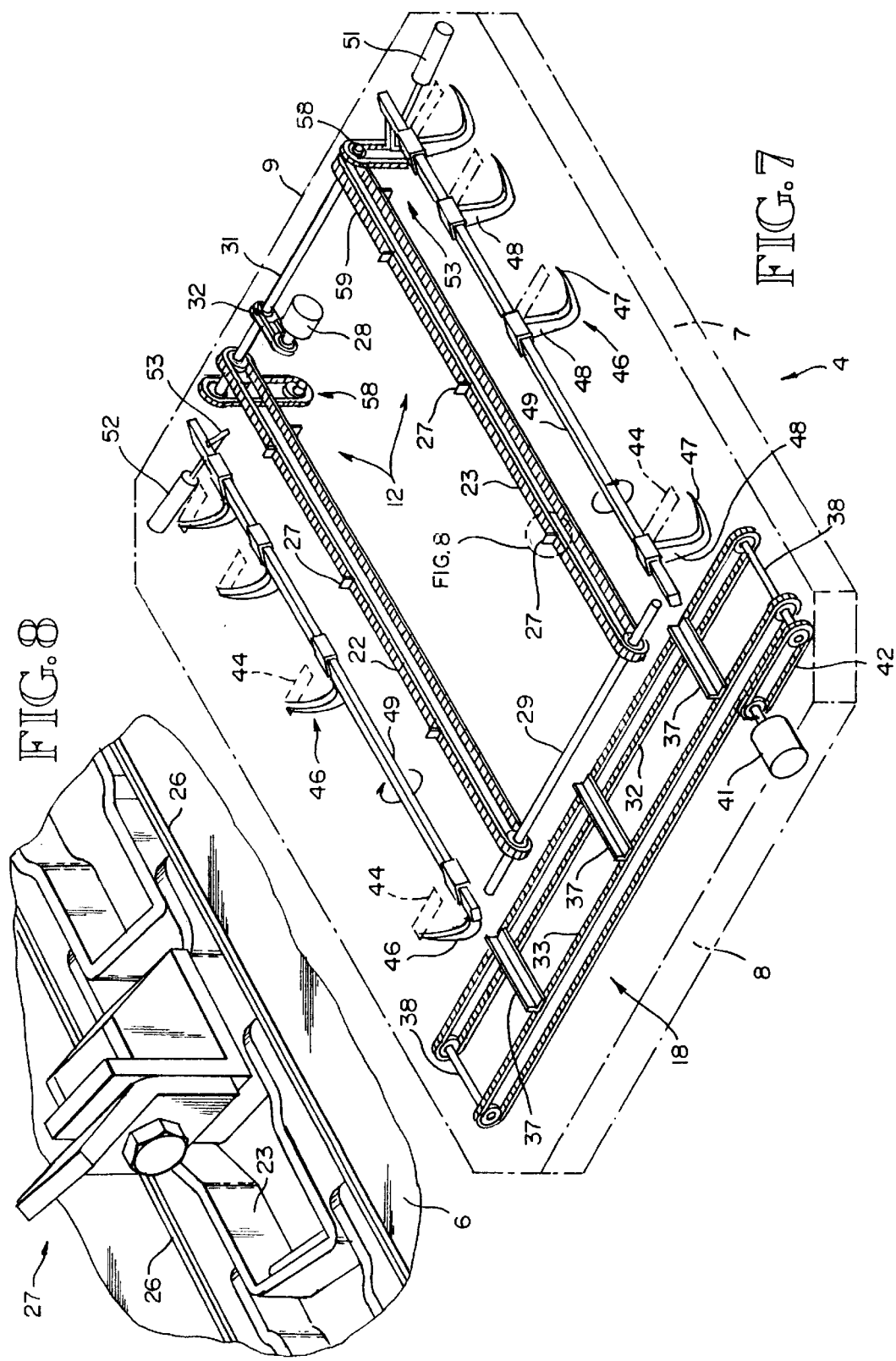

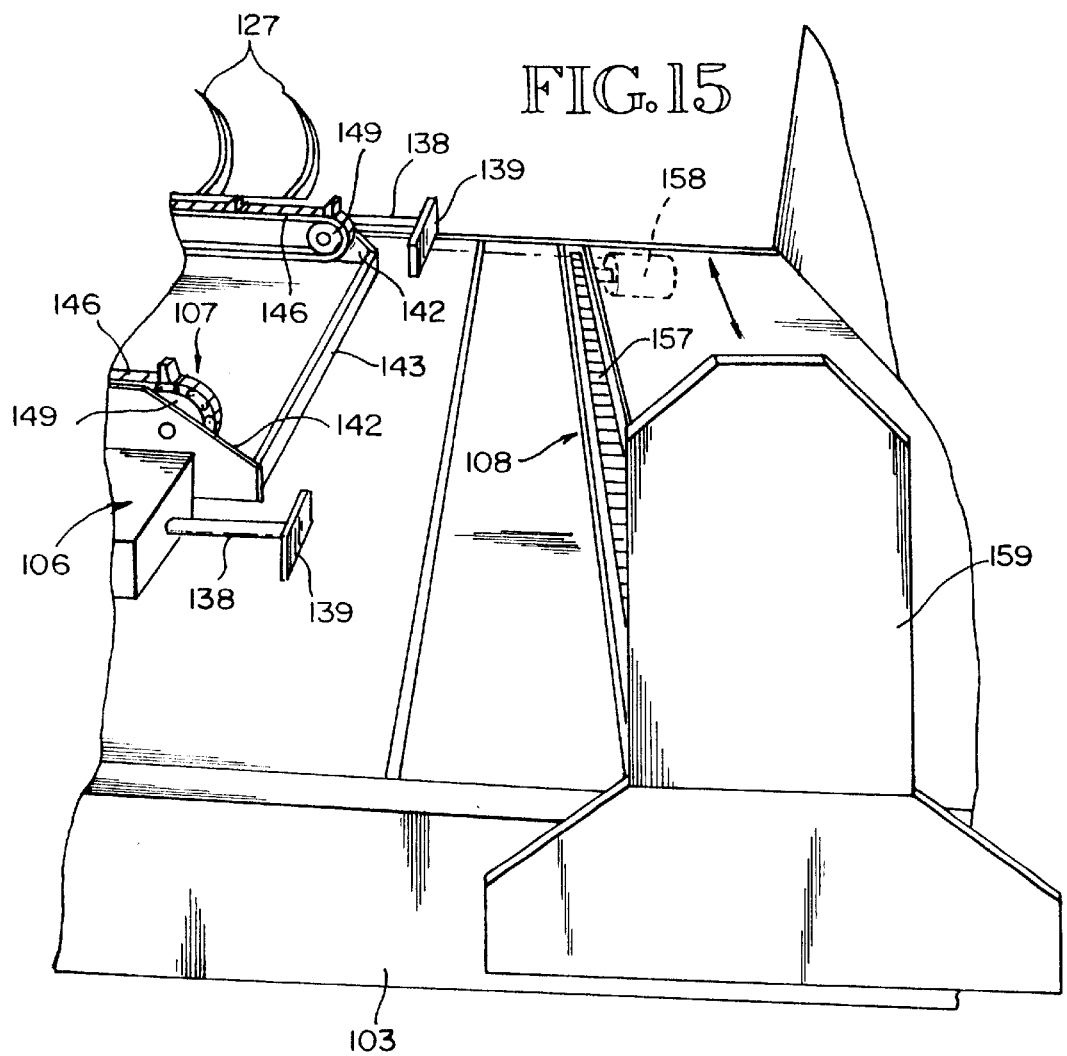
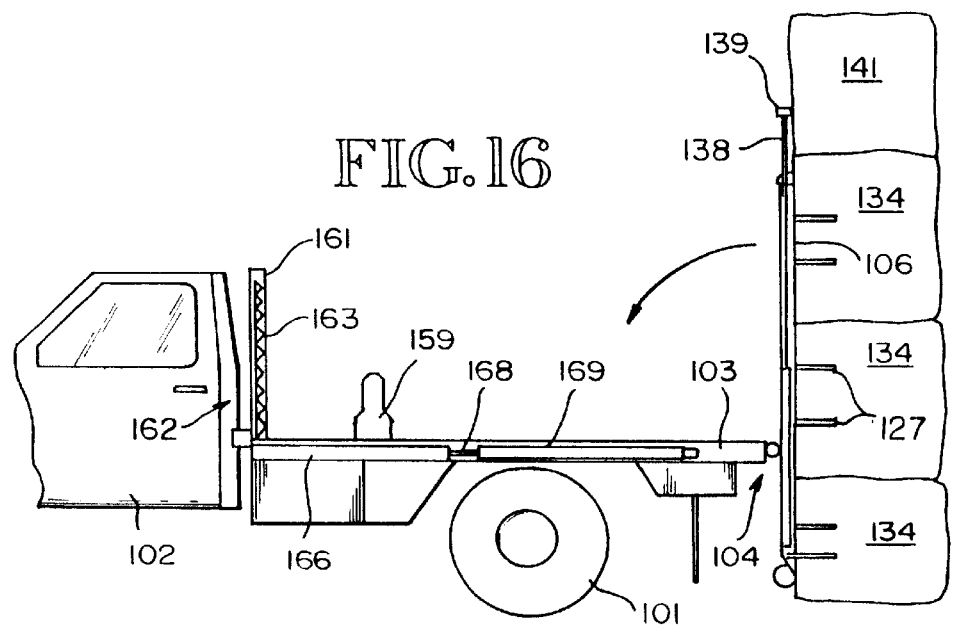

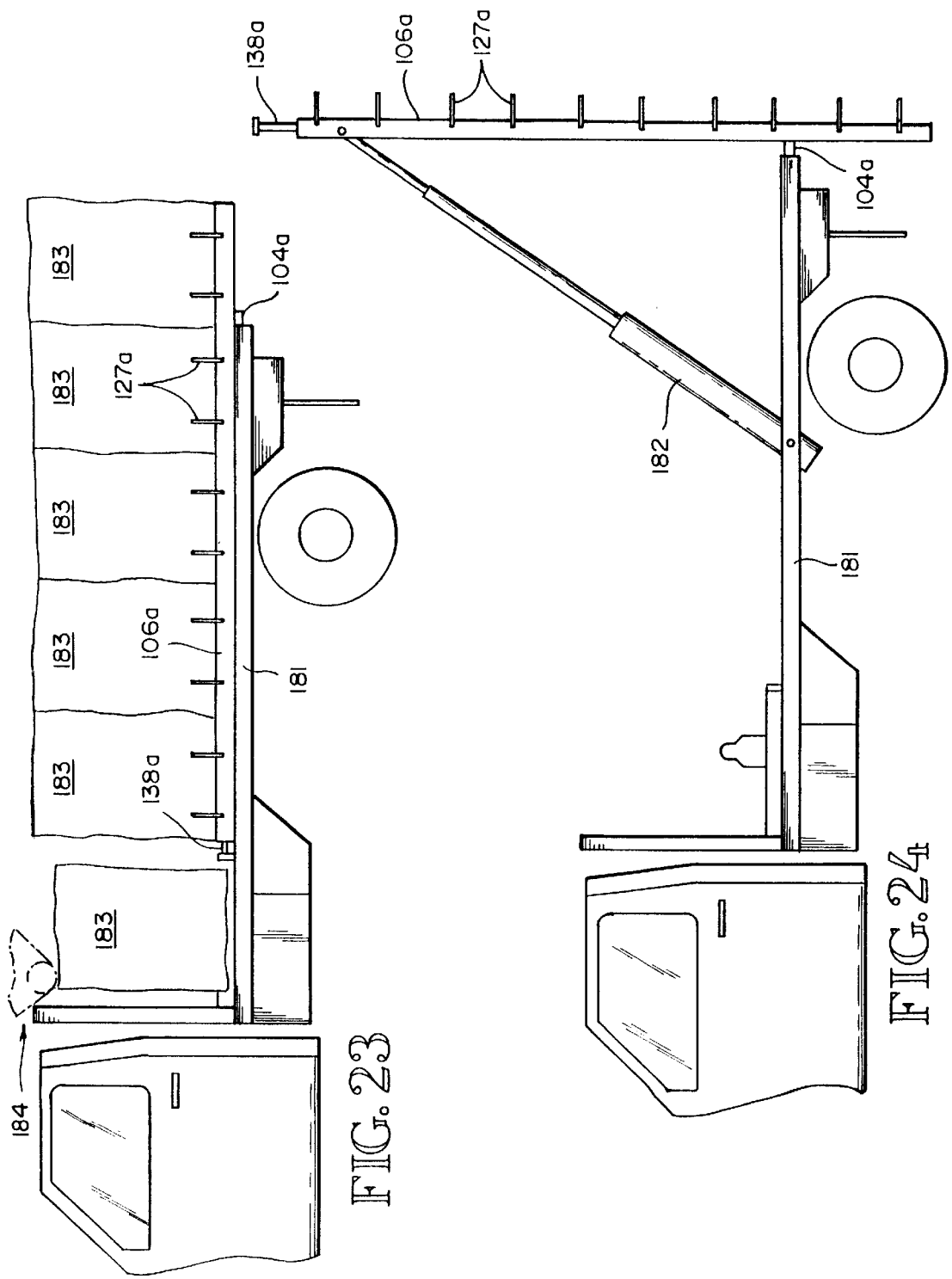

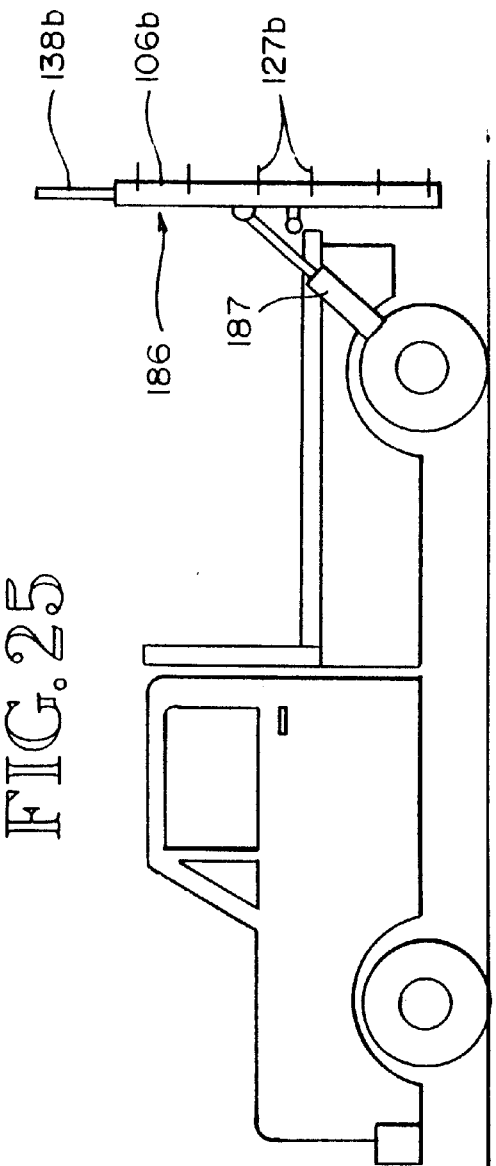

VEHICLE MOUNTED LARGE BALE LOADING, TRANSPORTING AND UNLOADING SYSTEM

This application claims the benefit, under U.S.C. 119(e) of U.S. Provisional Application Ser. No. 60/095,991 filed Aug. 10, 1998.

BACKGROUND OF THE INVENTION

1. Field of the Invention

The present invention relates to the handling of large bales of bulk material such as hay or silage with or without a containing wrap. More particularly, the invention relates to the handling of extremely large bales of the type described which are too heavy to be handled manually, and in particular, large rectangular cross section hay bales. The system includes the pick-up and moving or the loading of such bales onto the bed of a truck or other vehicle and subsequently unloading the bales for distribution as with range or bunk feeding of cattle or the like.

2. Description of the Prior Art

In recent years the trend in preserving hay in bales has been toward increasingly large size bales, far beyond the ability for manual handling. One approach is the production of large round bales several feet in diameter in the form of a layered roll which can then be pasture or range fed to cattle by simply unrolling the bale on the ground. The following listed patents are illustrative of prior art pick-up and transport equipment designed specifically for handling large cylindrical bales:

| U.S. Pat. No. | Patentee |
| --- | --- |
| 3,942,666 | Pfremmer |
| 4,050,598 | Schurz |
| 4,103,794 | Shaw |
| 4,376,607 | Gibson |
| 4,594,041 | Hostetler |
| 5,288,193 | Warburton et al |
| 5,333,981 | Pronovost et al |
| 5,340,259 | Flaskey |

This method, however has serious problems of wastage since the cattle foul the hay and use it for bedding. More recently the trend has been toward the formation of large rectangular or square cross section bales in the neighborhood of 8 feet in length and having a cross section of up to 4×4 feet known as "big bales". Large bales of this category may weigh in the neighborhood of 1000 to 2000 pounds per bale, are cumbersome and create a serious handling problem. Such bales normally require some form of mechanized equipment for pickup, transport, stacking and ultimately distributing and feeding. The following listed patents are illustrative of prior art pick-up and transport equipment designed specifically for handling large rectangular bales:

| U.S. Pat. No. | Patentee |
| --- | --- |
| 4,952,111 | Callahan |
| 5,690,461 | Tilley |
| 5,846,046 | Warburton |

Although satisfactory equipment has been developed for unloading and field distribution of layered round bales by simply unrolling, the need exists for an efficient mechanism for loading, transporting and unloading for distribution and feeding of large square or rectangular bales. Most existing equipment is concerned only with field pick-up and stacking involving such methods as robotic lifting arms, tilt beds such as shown in U.S. Pat. Nos. 5,405,229 and 5,542,803 to Tilley et al and Driggs respectively. These devices are not adapted for loading, transporting and feeding from a moving vehicle. Likewise common methods involving front end loaders and fork lifts require several pieces of equipment and operators and are thus uneconomical and time consuming. The following listed patents are illustrative of prior art pick-up and transport devices of the front end loader and elevator or fork-lift type equipment:

| U.S. Pat. No. | Patentee |
| --- | --- |
| 4,073,532 | Blair |
| 4,325,666 | Chain et al |
| 4,911,596 | Fetter |
| 5,082,413 | Grosz et al |
| 5,542,803 | Driggs |

SUMMARY OF THE INVENTION

The present invention contemplates a truck or other vehicle or trailer bed mounted mechanism and system for picking up a plurality of big bales of the rectangular type from a stack and loading the series of bales onto a mobile flatbed to be transported to a pasture or a range for instance where the bales are to be broken and distributed for feeding. Alternatively the bales may, of course, be moved from a field stack to a stacking/storage area for later pick-up and distribution.

In a first preferred embodiment of the invention a flatbed vehicle such as a motor truck or trailer is provided with a flatbed surface which is mounted for pivotal movement from a generally horizontal position through at least a 90° arc to a generally vertical position. A first longitudinally extending endless conveyor such as parallel chains or belts or other mechanism for moving articles longitudinally on top of the bed is mounted beneath the surface of the bed leaving the flat bed clear except for the movable conveyor elements. A second transverse or cross-bed conveyor, which may be of the same general type, is located forwardly of the longitudinal conveyor adjacent the front end of the flatbed. The cross-bed conveyor mechanism will also be located below the surface of the bed in the same manner as described for the longitudinal conveyor, again leaving the generally flat surface of the bed free for supporting articles to be transported. This type of arrangement allows articles, such as the large rectangular bales previously described, to be placed on the surface of the flatbed and moved forwardly by operation of the longitudinal conveyor to a position overlying the cross-bed conveyor for lateral discharge and distribution as will presently be described. The flatbed is thus equipped, in the horizontal position, to support and discharge large bales of hay off to one side of the bed for pasture or range feeding. In the vertical position the flat bed may be positioned against a vertical stack of a plurality of large bales for loading. For this purpose the opposite lateral edges of the flatbed are provided with a plurality of tine structures which are designed to be selectively engaged with the sides of the several large bales in the vertical stack while the flatbed is in the vertical position. The tines are carried on rotatable shafts and are movable through an arc from a position below the bed surface, via suitable openings in the bed surface, to the bale engaging position above the bed surface. The rotatable tine shafts as well as the mounting and operating means for the shafts are located below the bed surface, again allowing for a free unobstructed bed surface. This mode of operation allows the bed to be moved into the vertical position, backed up against a vertical stack of a plurality of large bales, the tines actuated to engage the bales and then the bed lowered to the horizontal position for transporting the bales on the flatbed surface.

The truck bed may be of sufficient length to have an adequate overhang in back of the rear wheels of the truck so that the bed, in the vertical position, will have its rear edge sufficiently close to ground level so as to engage the bottom bale in the stack. Alternatively, with smaller trucks having shorter beds, a pivotally mounted bed extension may be provided so as to be mechanically linked with the bed in the vertical position of the bed. This arrangement will also allow the flat bed to be provided with a fifth wheel or gooseneck hitch when used for other purposes. The pivoted bed extension will normally be disposed in a vertical position at the end of the flatbed and, when the flatbed is moved to a vertical position, the extension may be selectively coupled to the vertical bed and move along with the vertical bed to the horizontal position for loading a stack of bales. The raising and lowering of the truck bed, operation of both the longitudinal and cross-bed conveyors as well as actuation of the bale engaging tines may be accomplished by hydraulic motor means with provision for remote controls from either inside or outside of the cab. It will be understood, of course, that alternate motor means such as pneumatic or electrical motors may be substituted for the hydraulic motor means.

According to a second embodiment, a flatbed vehicle such as a motor truck or trailer is provided with laterally movable tines carried on longitudinal rails or on a frame, the rails or frame being pivoted for vertical movement from a substantially horizontal position to a vertical position. The laterally movable rails are equipped with tine structures designed to selectively engage the sides of several large bales in a vertical stack. The laterally movable rails are mounted for pivotal movement about the horizontal axis such that the distal ends of the tine structures extend beyond the truck bed, positioning the tines to engage each bale of a series of vertically stacked bales resting on the ground. In addition to the longitudinally extending rails, a longitudinally extending conveyor is mounted so as to pivot from the horizontal to the vertical position along with the laterally movable gripping rails. The longitudinal conveyor also extends beyond the end of the vehicle bed so as to underlie at least a substantial portion of the bottom most bale in the stack being lifted. The movement of the rails and the conveyor from the horizontal position atop the vehicle bed to the vertical position and the lateral movement of the rails for engaging the stack of large bales is remotely controlled by hydraulic means. Once engaged, the gripped bales, rails and conveyor are returned to the horizontal position atop the truck bed for transport.

A transverse or cross-bed conveyor is positioned at truck bed level forward of the longitudinal conveyor for side unloading of the bales from the truck bed. Once the gripped bales are moved to the horizontal position, the side rails and gripping tines are laterally disengaged, allowing the longitudinal conveyor to move the bales forward on the truck bed with the forward most bale being moved to a position atop the cross-bed conveyor. Individually operated pushing arms are carried by the laterally movable rail structure and serve to complete the forward movement of the bales onto the cross-bed conveyor and to align the bales for unloading. Once the forward most bale is in position for unloading and distribution, the baling ties are cut and the cross-bed conveyor is selectively operated to move the bale toward the side edge of the truck for unloading as the truck is moved forward. The hay may thus be distributed in spaced piles along the course of travel as it flakes off over the side of the truck bed as the bale is moved transversely. The entire combination of operations described may be accomplished by a single operator and a single vehicle utilizing hydraulics controlled from either the cab of the vehicle or remotely therefrom.

According to another form of the invention, the laterally movable rails are carried by a cross beam at the end of the truck bed with the longitudinal conveyor being detachably mounted on the same cross beam intermediate the rails. In this embodiment, the bale gripping tines are carried on longitudinally extending beams demountably attached to the rails. For storage purposes, the central conveyor and the tine carrying beams may be detached from the side rails and the cross bar respectively and pivoted together to form an A-frame which may be readily reconnected for its intended use.

In another embodiment, adapted mainly for larger trucks, the longitudinal conveyor, laterally moving rails and bale engaging beams may be mounted on a single pivot axis at the end of the truck bed. The unitary structure may then be raised and lowered by means of a single or multiple hydraulic rams pivotally connected between the bottom of the pivoted frame structure and the truck chassis. With this arrangement, up to six 8 foot long 32×32 and 32×48 inch bales or four 45×50 inch bales may be carried on a single bed.

In yet another embodiment, a tilt frame structure mounting the conveyor, side rails and bale engaging tines may be detachably mounted as a unit to the rear end of a truck or in the alternative dismounted and carried by such means as a front end loader or forklift. Instead of utilizing the laterally movable rails described, the gripping tines may be mounted, one or more on each side of the frame, and connected for gripping movement by a double acting cylinder(s) also carried on the tilt frame. The demountable tilt frame may be either pivoted to the end of the truck bed and raised and lowered by a pivotally mounted hydraulic ram extending between the frame and the truck chassis or on a cross beam which is itself rotatable around a transverse axis by appropriate linkage and hydraulic rams.

In certain situations, such as during freezing weather, when the bale does not naturally flake off, a bale cut-off device may be provided in conjunction with the cross-bed conveyor for more effective distribution such as range feeding. A sickle-bar, rotary knife, hydraulic ram shear or other cut-off device may be used to selectively cut off sections of the bale protruding from the truck bed edge.

BRIEF DESCRIPTION OF THE DRAWINGS

FIG. 3 is a partial perspective view of the flatbed in the vertical position with the bale engaging tines extending above the level of the truck bed;

FIGS. 4–6 illustrate the sequence of steps involved in engaging a vertical stack of bales and moving the stack to the horizontal hauling position atop the flatbed;

FIG. 7 is a perspective view, with parts removed, showing the longitudinal and cross-bed conveyor mechanisms and tine mounting shafts beneath the level of the truck flatbed;

FIG. 8 is a detailed perspective of a conveyor lug taken at the circled area in FIG. 7;

FIG. 15 is a perspective view of the cross-bed conveyor system of the FIG. 11 embodiment;

FIG. 16 is a side elevational view of the loading mechanism of the FIG. 11 embodiment in the vertical position;

FIGS. 23 and 24 are side elevational schematic views illustrating a third embodiment of the loading and unloading system wherein the conveyor and laterally movable gripping rails and tine beams are mounted on a flatbed truck with an hydraulic ram connected between the frame unit and the truck chassis for moving the frame unit from the horizontal to the vertical position; and FIGS. 25 and 26 are side elevational schematic views illustrating bale gripping mechanisms designed for alternative connection to the rear end of a truck bed and a tractor-like vehicle such as a forklift or a front end loader.

DESCRIPTION OF THE PREFERRED EMBODIMENTS

Figure 1:
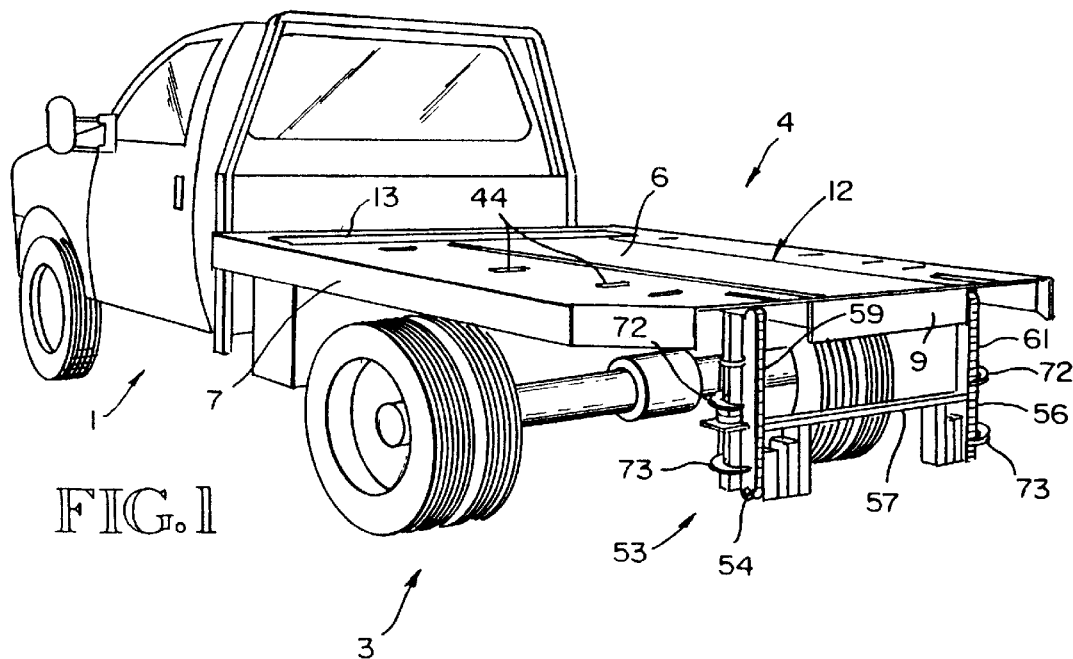
FIG. 1 is a perspective view of the truck-mounted loading and unloading system with the flatbed in the horizontal hauling position.
Figure 2:
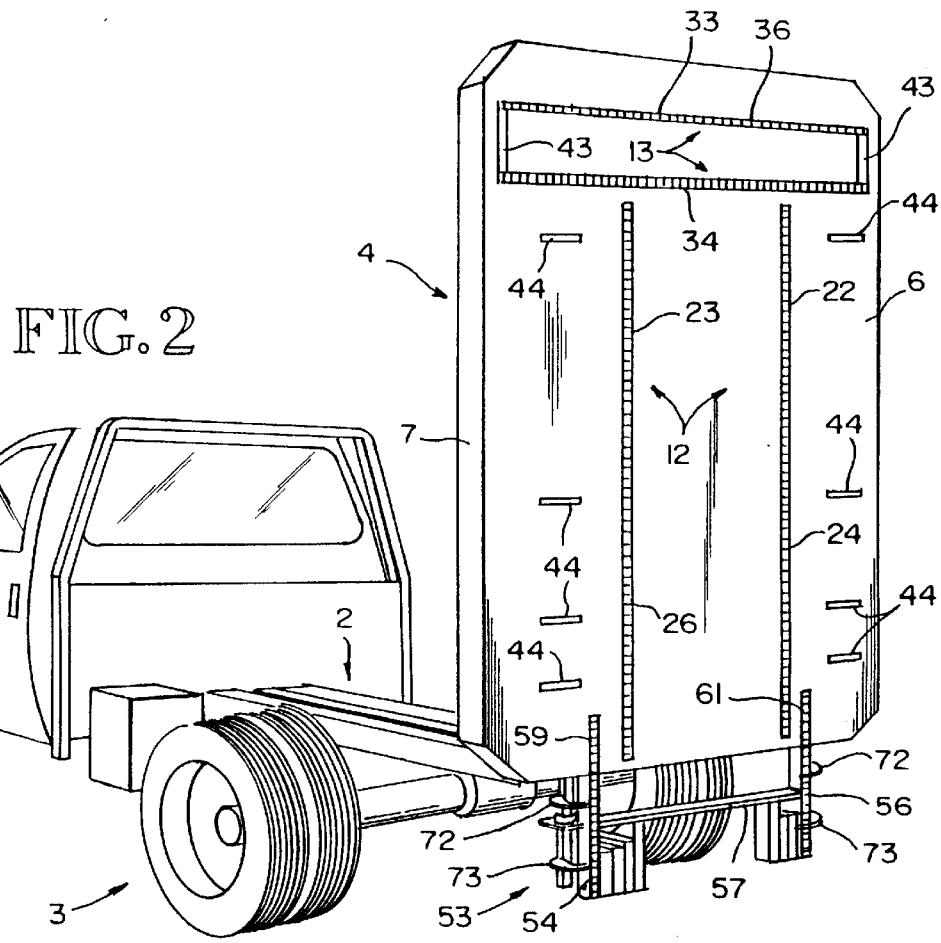
FIG. 2 is a perspective view of the system with the flatbed in the vertical bale engaging position.
Figure 9:
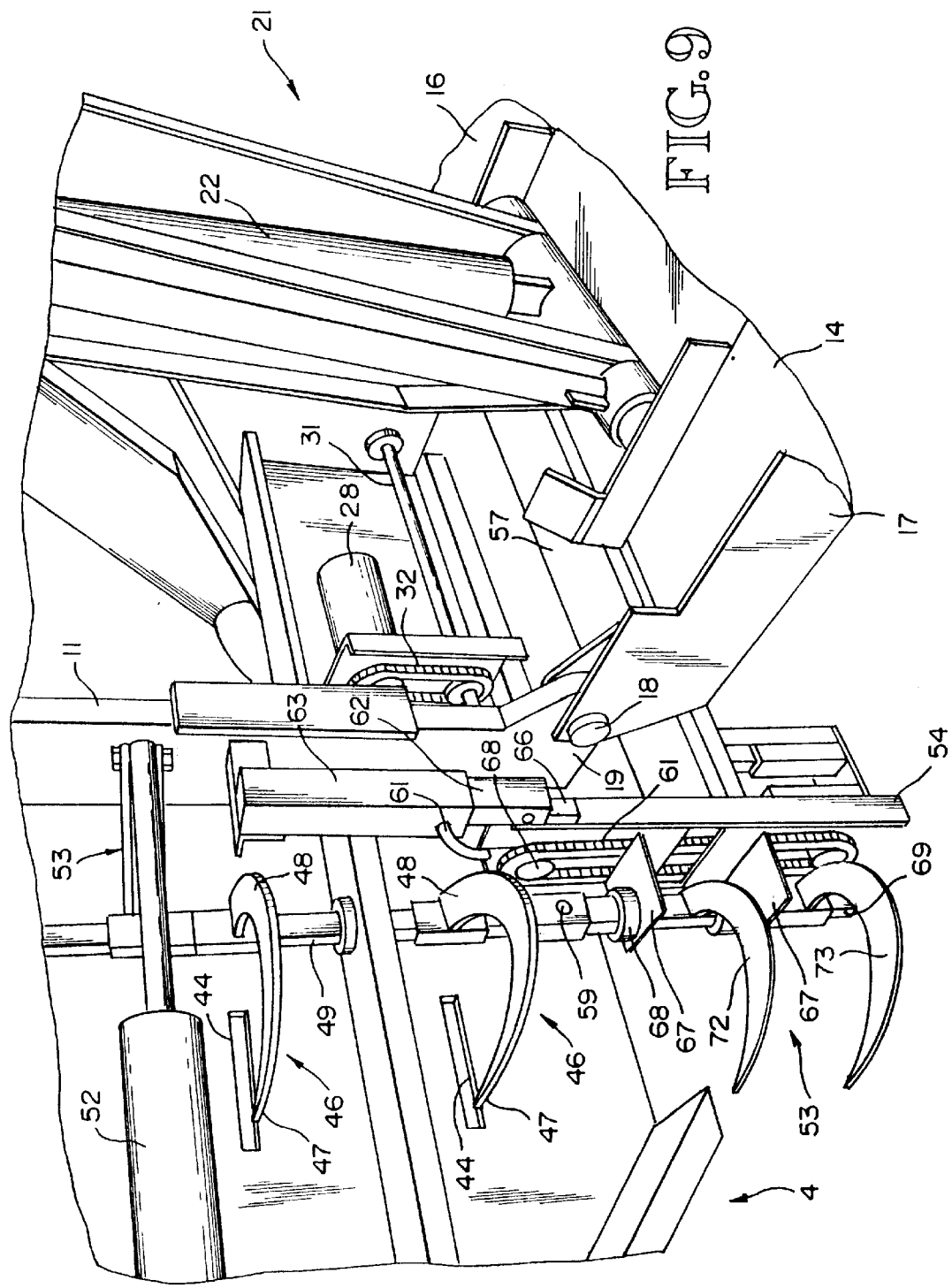
FIG. 9 is a detailed perspective view showing the mounting of the tine shafts and the means for connecting a pivotally mounted bed extension to the truck bed in the vertical position.

FIGS. 1 and 2 illustrate a loading, transporting and unloading system according to the present invention as mounted on a flatbed truck which includes the usual cab section 1, chassis frame 2 and ground support wheels 3. Although the present embodiment is illustrated utilizing a particular flatbed truck, it will be understood that the wheeled vehicle may be of any design or, in the alternative, may comprise a trailer having a wheel supported chassis or frame. In the present embodiment, the truck frame 2 mounts a load carrying flatbed indicated generally at 4 with a load supporting surface 6 usually constructed from steel plating. Typically, the bed 6 will be provided with side paneling 7 and end panels 8, either integral with the bed or connected by welding or the like. The bed 6 may be equipped with any known configuration of structural bracing including the longitudinally extending beams 11 as shown in FIG. 9. The beams 11 may be secured to the underside of the bed structure and will provide a transverse pivotal connection at the rear of the bed and truck chassis for raising and lowering the bed structure 4 as will presently be described. The bed 4 is further provided with a longitudinally extending endless chain conveyor system indicated generally at 12 and a similar endless chain cross-bed conveyor indicated generally at 13. As seen in FIGS. 1–3, the longitudinally extending conveyor system 12 runs from a point adjacent the rear edge of the bed 6 forwardly to the cross-bed conveyor 13. The conveyor 13 extends adjacent the front end of the bed and over the substantial width of the bed.

Referring to FIG. 9, the chassis frame 2 includes the parallel chassis beams 14 and 16 which are structurally connected to the truck frame. The beams 14 and 16 include upstanding flanges, only one of which is shown at 17 in FIG. 9, for mounting a pivot pin 18 which connects the chassis beams to the rear end pivot section 19 of the longitudinal bed beams 11. It will be understood that the hydraulically driven raising and lowering linkage unit 21 may be any known hydraulic lift mechanisms for raising and lowering truck beds. The unit 21 will include the main lift cylinder 22, the operation of which raises and lowers the flatbed 4 from the horizontal to the vertical position as shown in a manner well known in the art.

Referring to FIG. 7, the longitudinal conveyor system 12 includes the parallel conveyor chains 22 and 23 located beneath the surface of the bed 6 with their upper runs being exposed through associated elongated openings 24 and 26 respectively in the bed surface 6. Each of the chains 22 and 23 will include spaced lug structures 27, shown in detail in FIG. 8, for engaging the hay bales for the purpose of moving the bales forwardly on the bed 6 toward the side distribution cross-bed conveyor 13 in a manner to be described. The conveyor chains 22 and 23 in the present embodiment are housed within the channels 11 carried on the underside of the bed 6 and are driven by means of the hydraulic motor 28 also mounted on a suitable support structure beneath the bed 6. Both chains 22 and 23 are trained about suitable idler sprockets on forward idler shaft 29 and about drive sprockets carried on the rear drive shaft 31 with the drive shaft 31 being driven by means of the drive chain 32 connected to the hydraulic motor 28 output shaft. The hydraulic motor 28 is preferably a reversible hydraulic motor allowing the conveyor chain to be driven in either direction depending on the needs of the operator.

FIG. 7 also illustrates the details of the cross-bed conveyor system 13. This system includes two parallel conveyor chains 32 and 33 which are mounted beneath the surface of the bed 6 with their upper runs being exposed through suitable elongated openings 34 and 36 respectively in the bed 6. In the embodiment illustrated, the chains 32 and 33 will be equipped with cross flights 37 as shown in FIG. 7 in the form of angle irons or the like which serve to engage the bale bottom to move it laterally off the side of the bed. Other means such as lugs or the like may also be used. The chains 32 and 33 are trained about suitable sprockets on the idler shaft 38 and trained about drive sprockets located on the drive shaft 39 at the opposite side of the bed. The conveyor system 13 may be driven by the reversible hydraulic motor 41 which is drivingly connected to the shaft 19 via the drive chain 42. Sufficient clearance, by means of openings 43 in the bed 6, will be provided at each end of the conveyor system 13 to allow for passage of the flights 37 and the conveyor chains may be driven in either direction as desired by the operator. As thus far described, with individual and separate controls for the hydraulically driven longitudinal conveyor system and the cross-bed conveyor system, large rectangular objects such as hay bales carried on the bed in the horizontal position may be moved forwardly and consecutively placed on the cross-bed conveyor 13 for discharge to one side or the other of the bed.

Figure 5:
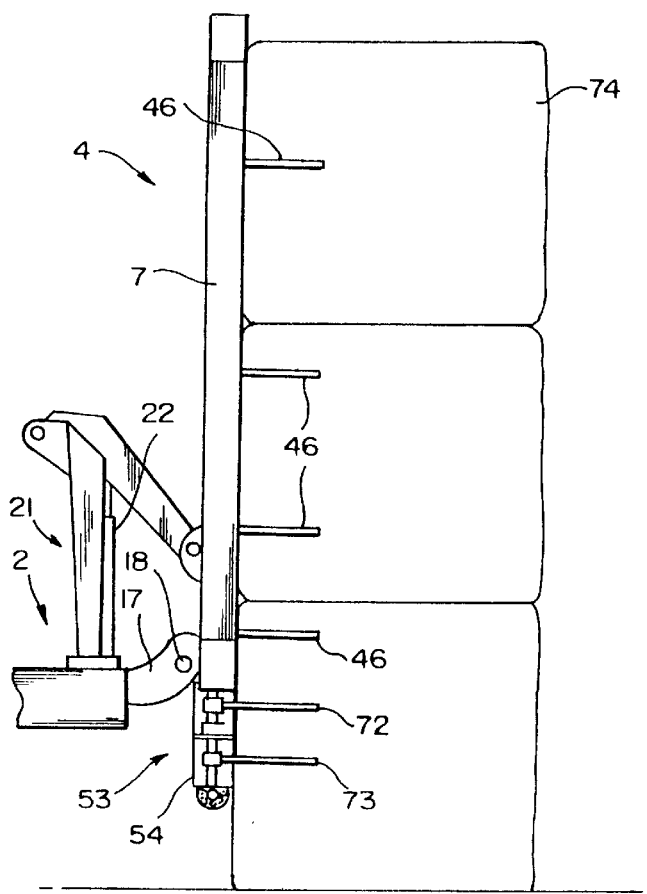
Figure 6:
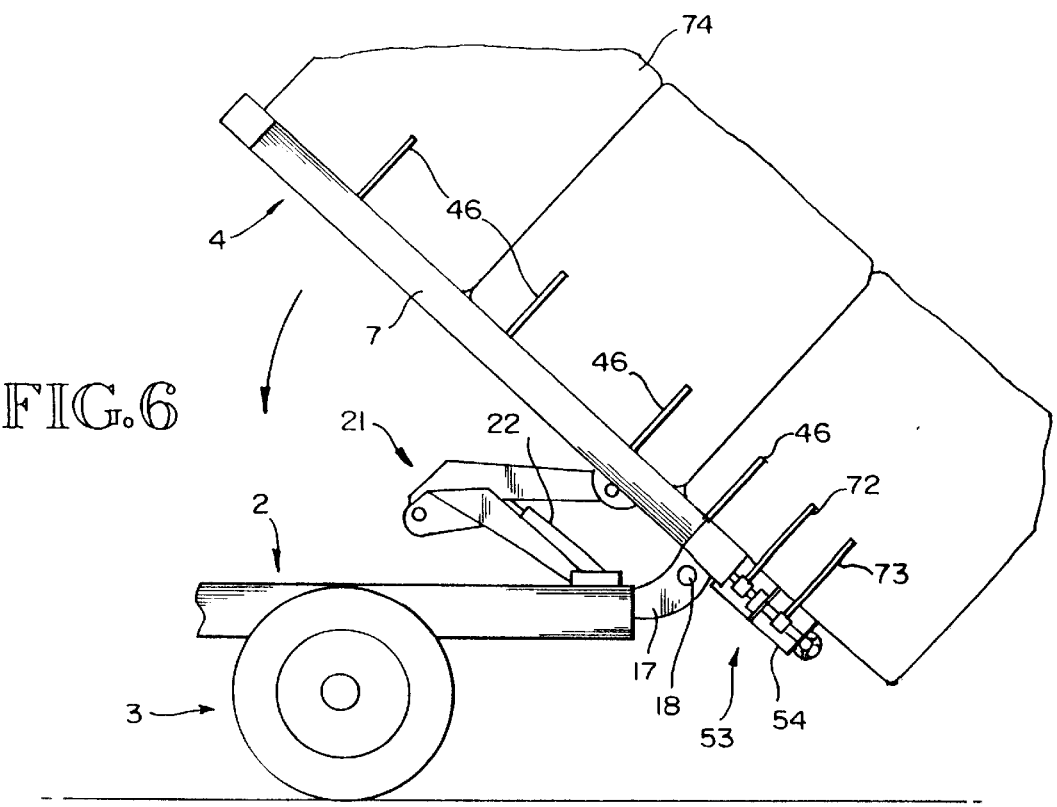

As previously explained, the bed 6 is designed to be lifted from the horizontal position shown in FIG. 1 through at least a 90° angle by means of the lift system 21 to a vertical position such as shown in FIGS. 2–5. In this position the surfaces of a plurality of large rectangular hay bales in a vertical stack may be engaged as shown in FIGS. 4 and 5. In order to secure the stack of bales to the vertical bed surface during loading, the bed 6 is provided with a plurality of bale engaging tines along each lateral edge or side area as shown most clearly in FIGS. 1–3 and 9. For this purpose, each side of the bed is provided with a plurality of spaced openings 44 along the length of the conveyor chains 22 and 23. Each opening 44 is in the shape of an elongated rectangle so as to allow passage of an associated tine structure 46, which is movable from a position beneath the surface of the bed 6 to a bale engaging position above the bed surface as shown in FIGS. 5 and 6. As shown most clearly in FIGS. 7 and 9, each tine includes a bale engaging tip 47 and a curved shank 48 which is fixed on the associated rotatable shaft 49 mounted beneath the bed as shown in FIG. 7. As will be clear from the illustration in FIG. 7, rotation of the two parallel shafts 49 pivots the bale engaging tine structures 46 from a position beneath the bed 6 through the openings 44 and into the bale engaging position shown in FIGS. 3, 5 and 6. The shafts 49 will be mounted in any suitable bearing supports beneath the bed 6 and will be operated by means of hydraulic cylinders 51 and 52 respectively. The hydraulic rams 51 and 52 are operatively connected through a linkage 53 for rotating the shafts 49 so as to actuate the bale engaging tines 46. The hydraulic rams 51 and 52 may be either individually actuated or operated under a single control for engaging a stack of bales.

The illustrated embodiment of the flatbed truck vehicle is of the type wherein the bed overhang is of such dimensions as to provide for the mounting of a fifth wheel or a gooseneck trailer hitch. In such instances the overhang of the bed 6 is not sufficient to allow the lower end of the bed to effectively engage the bottom bale on the stack with the bed in the vertical position. In order to compensate for this and to retain the capability of mounting a gooseneck trailer hitch, a selectively engagable conveyor and bale engaging tine structure or extension 53 is mounted on the rear end of the bed. The structure 53 comprises a conveyor frame including the laterally spaced channel irons 54 and 56 which are connected by a cross beam 57 and have their upper ends supported on the drive shaft 31 of the longitudinal conveyor system 12. This relationship is shown in FIG. 9 and it will be understood that the channel irons 54 and 56 are mounted on suitable bearings (not shown) on the shaft 31 for free rotation. Each distal end of the shaft 31 is provided with a drive sprocket 58 which rotates with the shaft 31 for the purpose of providing a simultaneous drive to the conveyor chains 59 and 61 of the extension 53. As seen most clearly in FIGS. 2 and 3, the bed 6 is provided with elongated openings in its rear edge to accommodate the conveyor chains 59 and 61 when the bed is moved to the vertical or stack engaging position. With the bed in the vertical position, the extension 53 is locked into alignment with the vertical bed by means of the steel slide bars 62, one of which is shown in FIG. 9. The slide bars 62 will normally be contained in the channel 63 welded or otherwise firmly attached to the bed structure such as at the beams or channels 11 as shown in FIG. 9. With the bed in the vertical position, the pin 64 is removed allowing the slide bar 62 to drop against the stop 66 locking the extension 53 in line with the truck bed and the conveyor system 12.

The channel irons 54 and 56 are each provided with laterally extending mounting plates 67 attached thereto by welding or the like for mounting bearing blocks 68 for rotatably supporting the shaft 69. With the bed in the vertical position, the shaft 69 will be in alignment with the tine mounting shaft 49 of the bed and may be rotatably coupled thereto by means of a suitable coupling sleeve 71. The sleeve 71 may be manually locked in place by any suitable locking pin arrangement such as illustrated in FIG. 9. The shaft 69 is thus locked to the shaft 49 for rotational movement therewith. Each shaft 69 is provided with two spaced bale engaging tines 72 and 73 which may be in all respects identical to the tine structure 46 previously described. With the shafts 69 and 49 coupled, the tines on the extension 53 operate in unison with the tines on the bed 6 and serve to engage the bottom bale as shown in FIGS. 5 and 6 during the pick-up process. Although the illustrated embodiment utilizes manual means for coupling the conveyor and tine shafts of the extension 53 to the truck bed conveyor system and tine shafts, it will be apparent to those skilled in the art that remotely controlled motor means may be adapted for accomplishing the connection.

Figure 10:
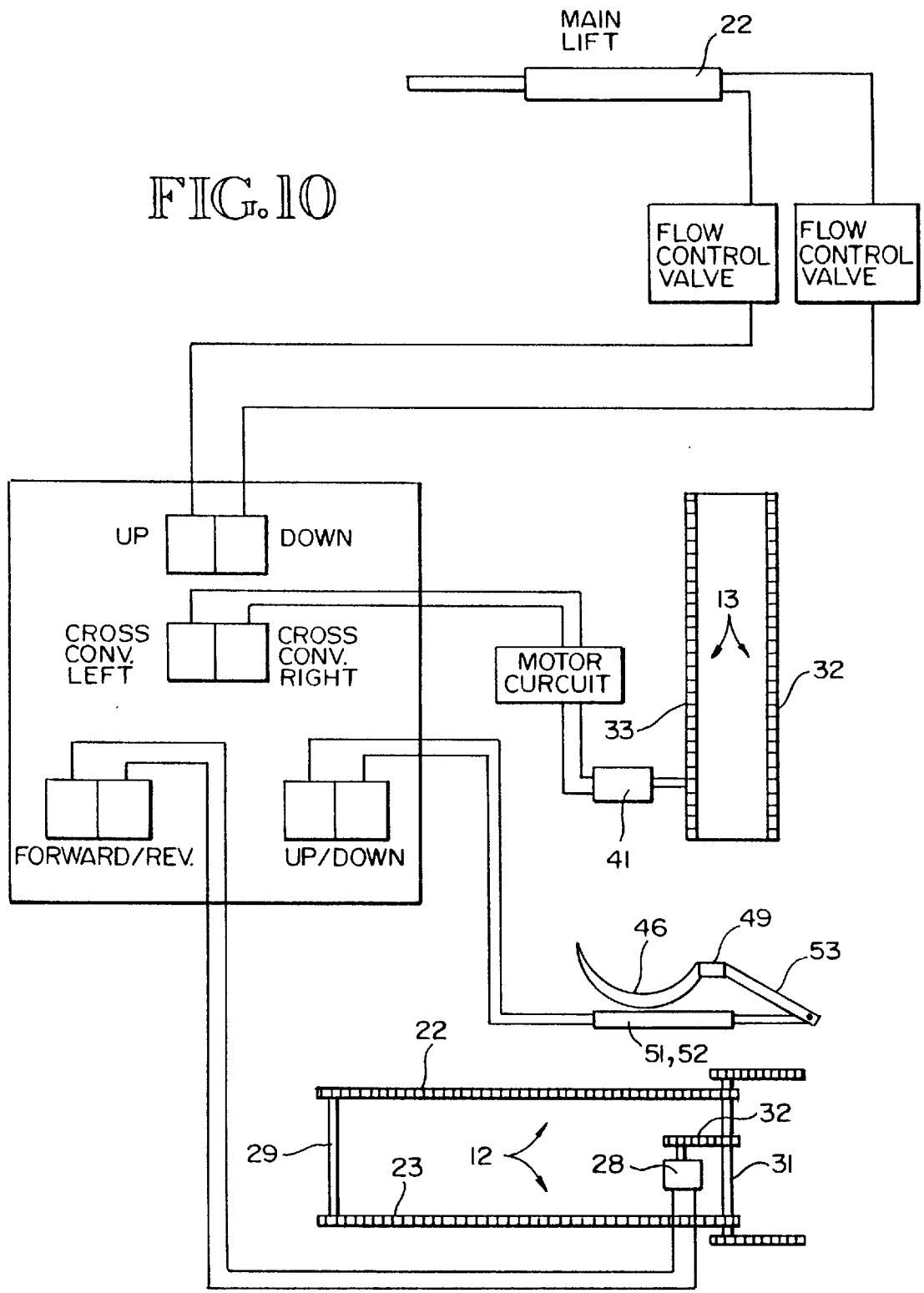
FIG. 10 is schematic showing a typical hydraulic control system for operating the various components of the system.

FIG. 10 is a schematic diagram illustrating the hydraulic controls for operating the various components of the loading, transport and unloading sequence of the system. With the truck bed in the initial horizontal position as shown in FIG. 1, the lift cylinder 22 will be actuated to raise the bed 6 to the vertical position shown in FIG. 2. The conveyor system and bale engaging tine shaft of the extension 53 are then coupled to the truck bed as previously described. The truck is then backed up against the stack of bales as illustrated in FIG. 4 and the cylinders 51 and 52 are actuated to move the tines 46, 72 and 73 into engagement with the sides of the bales as illustrated in FIG. 5. Once the tines are engaged, the cylinder 22 is actuated to move the bed 6 to the horizontal position illustrated in FIG. 6. If the bales are to be moved to a stacking or storage location the tines may remain engaged and the process steps reversed in order to raise the bed and deposit the stack of bales. If the bales are to be distributed off the side of the bed for pasture feeding, for instance, the cylinders 51 and 52 are retracted to lower the bale engaging tines and the bales are then free to be conveyed on the surface of the bed 6. The front end bale 74 or top bale on the stack at this time will be resting on top of the cross-bed conveyor 13 ready for unloading. Once the bale ties are broken, the cross-bed conveyor motor 41 may be actuated to move the bale laterally which will drop off the edge of the bed in flakes or layers as the truck is moved forwardly to distribute the hay in spaced piles. Once the bale 74 has been unloaded, the conveyor motor 48 for the conveyor 12 is actuated to move the next successive bale forward to overlie the cross-bed conveyor 13 and the process is repeated. If it is desired to utilize the flatbed truck for other purposes, the empty bed will be raised to the vertical position and the slide bar 62 returned to its retracted position. The shaft 69 is then uncoupled from the shaft 49 by sliding the connector 71 out of engagement thus allowing the extension 52 to remain in the vertical position as shown in FIG. 1 when the bed 6 is moved, by operation of the cylinder 22, to the horizontal position as shown in FIG. 1.

Referring to FIGS. 11–18 and 22, a second embodiment of the loading, transport and unloading system of the present invention is illustrated which is designed to be mounted on a motorized wheeled vehicle such as a flatbed truck having ground wheels 101, cab section 102 and a horizontal bed 103. As will presently be described, the bed structure will be of a specialized design so as to include in this embodiment, a hydraulically operated pivotally mounted cross beam 104 on the rear edge thereof for raising and lowering bale engaging beams 106, and longitudinal conveyor indicated generally at 107, about a transverse horizontal axis. A cross-bed conveyor 108 is located at the forward end of the bed.

Figure 11:
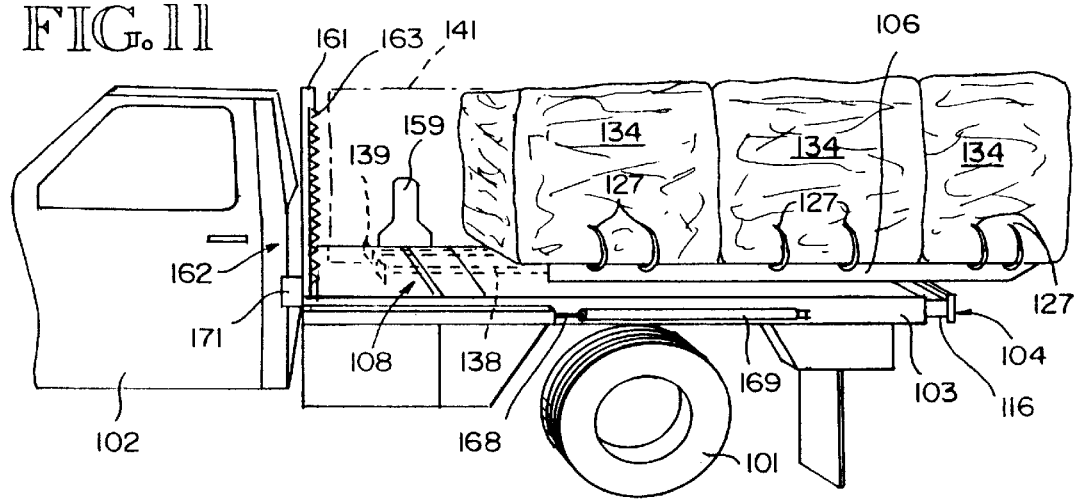
FIG. 11 is a perspective view of a truck-mounted loading and unloading system according to a second embodiment of the present invention.
Figure 12:
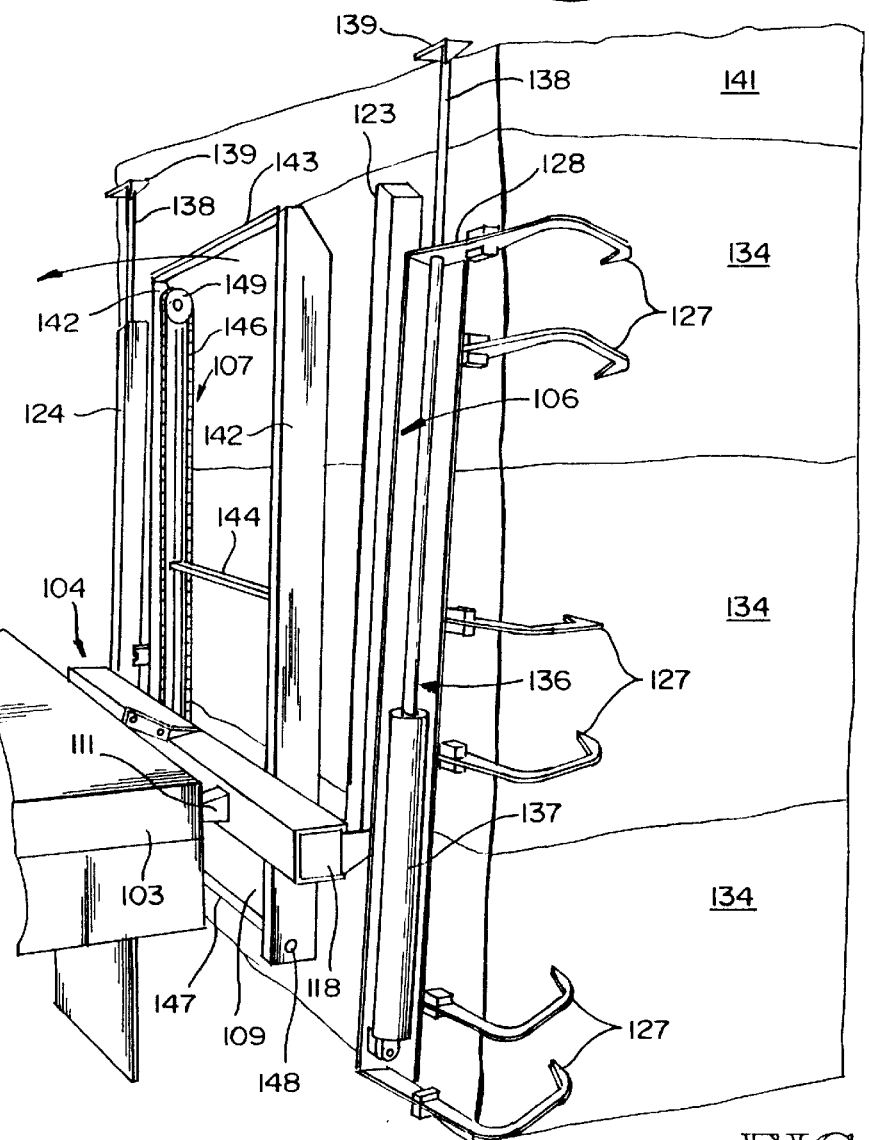
FIG. 12 is a perspective view of the FIG. 11 embodiment showing the longitudinal conveyor and laterally moving bale gripping structure in the vertical position.
Figure 13:
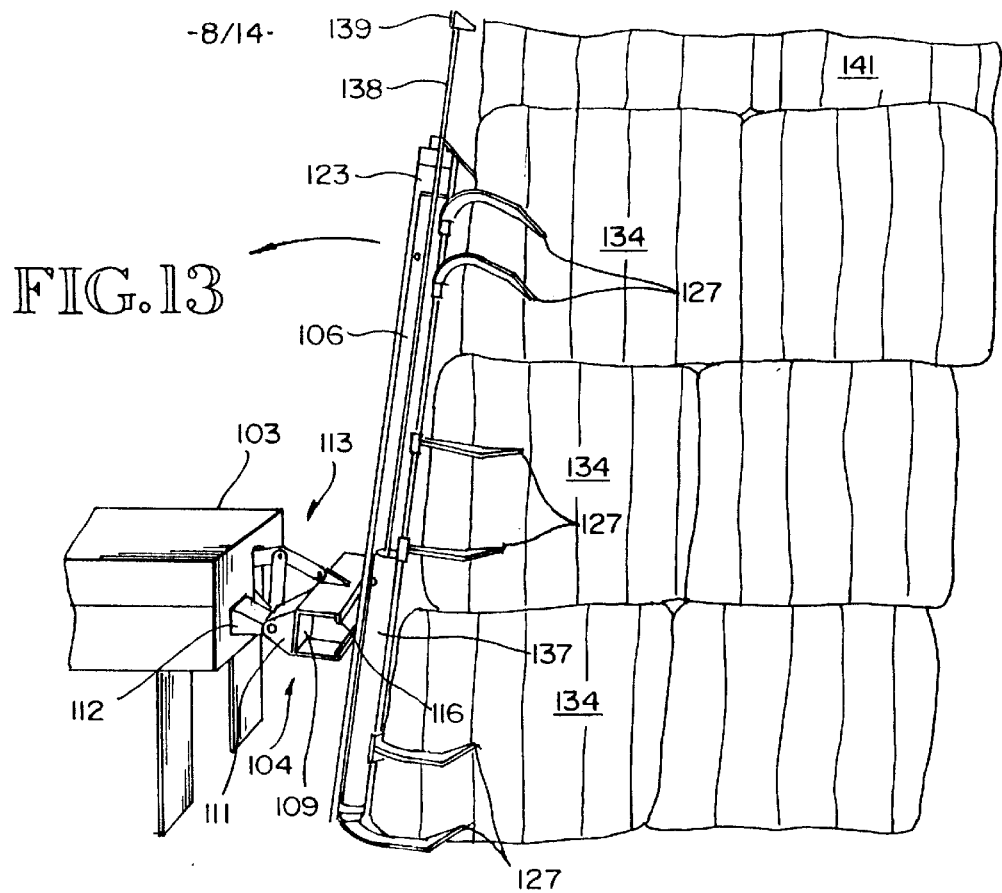
FIG. 13 is a perspective view of the loading mechanism of the FIG. 11 embodiment in the vertical gripping position.
Figure 14:
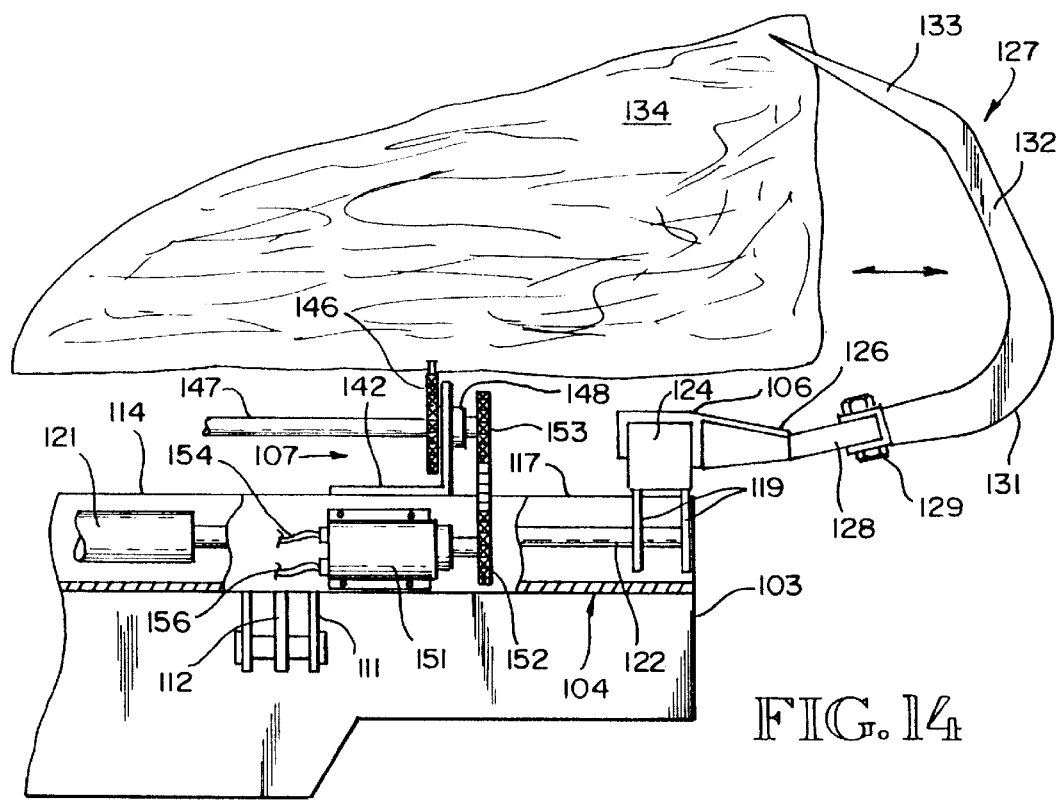
FIG. 14 is a partial end elevational view of the FIG. 11 embodiment with parts broken away to show the operation of the laterally moving rails and the conveyor system.

As seen most clearly in FIGS. 12–14, the cross beam 104 may comprise a hollow channel extending substantially the width of the truck bed 103 and located on the back edge thereof. The channel has a bottom wall 109 provided with spaced yokes 111 which are pivotally connected to the associated bracket extensions 112 welded or otherwise connected to the back face of the bed 103 as shown in FIG. 13. This pivotal relationship allows the beam 104 to pivot about a horizontal axis from its upright position shown in FIG. 11 through at least 90° to the position shown in FIGS. 12 and 13. Any form of operating linkage, indicated generally at 113 in FIG. 13, connected to a conventional hydraulic ram (not shown) beneath the bed 103 may be used to pivot the cross beam through the 90° plus angle. Such linkages are known in the art, one such linkage being shown in U.S. Pat. No. 4,594,041 to Hostetler.

Figure 17:
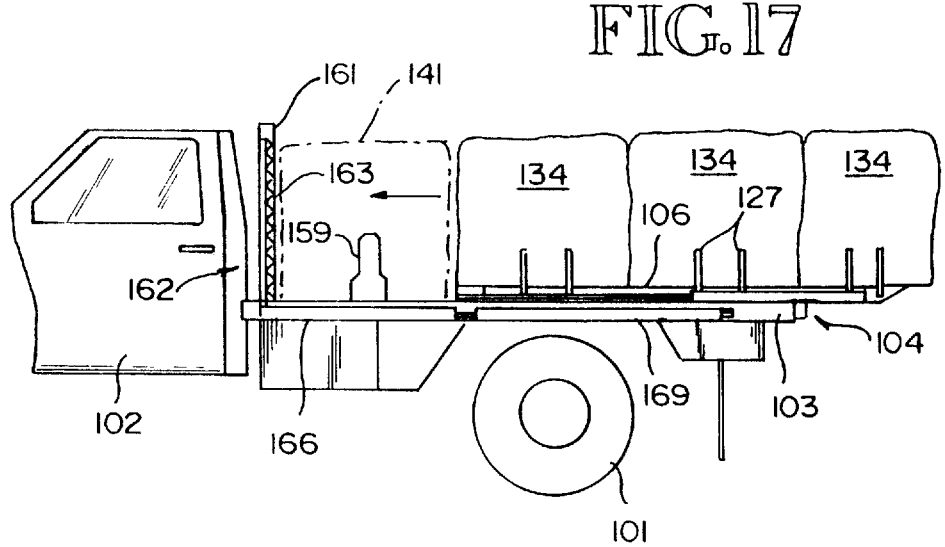
FIG. 17 is a side elevational view of the loading mechanism of the FIG. 11 embodiment in the horizontal loaded position.
Figure 18:
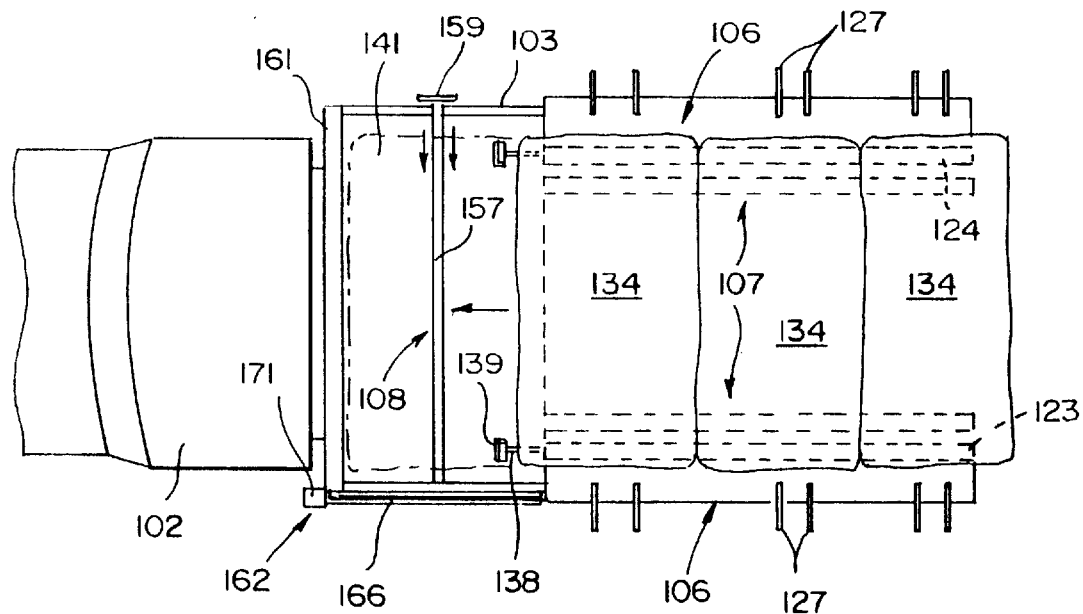
FIG. 18 is a top plan view of the FIG. 11 embodiment showing the loaded bales in position on the truck bed.

As will be noted in FIGS. 13 and 14, the ends of the hollow beam 104 are open and the top wall 114 thereof opposite the wall 109 has cutaway end sections 116 and 117 respectively which allow for lateral movement of mounting brackets 118 and 119 respectively for a purpose to be described. The brackets 118 and 119 are each connected to a respective hydraulic ram, one ram only being shown at 121 in FIG. 14. The associated bracket may be connected directly to the piston rod 122 of the ram 121 as illustrated in FIG. 14. Each of the end brackets 118 and 119 is rigidly connected to an elongated rail 123 and 124 respectively with each of the rails extending forwardly from the brackets when in the horizontal position as shown in FIGS. 11, 17 and 18. These rails extend substantially vertically when the cross beam 104 is pivoted through an approximate 90° arc as shown in FIGS. 12 and 13. Additionally, by operation of the two rams 121 on either side of the cross beam 104, the rails 123 and 124 may be selectively moved inwardly and outwardly in lateral motion.

Elongated gripping beams 106 are carried on the rails 123 and 124 and may be rigidly connected thereto by bolting or welding so as to be rigid with the rails. The beams 106 extend rearwardly beyond the ends of the associated rails 123 and 124 to overhang the rear end of the truck bed. With this structure, when the rails 123 and 124 are in the vertical position, the bottom ends of the beams 106 are closely adjacent ground level for the purpose of engaging the bottom most bale in a vertical stack as illustrated. Each beam 106 includes a longitudinally extending flange 126 for the purpose of mounting a plurality of bale engaging tines 127 with each tine being clamped to an associated bracket 128 carried by the flanges 106. Any suitable means such as a clamping bolt 129 shown in FIG. 14 may be used to hold the tines in position.

Referring to FIG. 14, the tines 127 are so configured as to include an outwardly curved portion 131, and inwardly directed arm 132 and a bale engaging point 133 designed to pierce the surface of the bale. With this configuration, and lateral movement of the rails 123 and 124, as illustrated in FIG. 14, the tines may be caused to engage and penetrate the bale surface to effectively hold the bales against the beams 106 and the longitudinal conveyor presently to be described. As shown in the preferred embodiment, tines 127 may be grouped in pairs so as to engage each hay bale 134.

Referring to FIG. 12, each of the beam structures 106 is provided with an independently controllable bale carrier and push arm assembly indicated generally at 136. Each assembly 136 includes a hydraulic ram 137 fixed to the rear end of the beam 106 beneath the flange 126 as shown in FIGS. 12 and 13. The ram may be welded or bolted in place on the beam 106 with its extended piston rod 138 passing through and guided by the end bracket 128 on the opposite end of the beam and functioning as a carrier/pusher arm. The outer ends of the carrier/pusher arms 138 are identical and are fitted with bale aligning end caps 139 as presently to be described. As may be seen in FIGS. 12 and 13, the carrier arms 138 form extensions of the beams 106 which reach beyond the forward ends of the conveyor 107 and rails 123 and 124. With this arrangement, a fourth bale 141 may be lowered onto the truck bed and positioned atop the cross bed conveyor 108. With the bales in the horizontal position as shown in FIG. 11, the push rods 138 are withdrawn allowing the bale 141 to rest on top of the cross bed conveyor 108 ready for side unloading. In the event that the bale 141, or any subsequent bales 134, require a forward push or aligning with the cross conveyor 108, the push rods 138 may be operated independently and, via the end caps 139, maneuver and align the bale.

The longitudinal conveyor 107 includes parallel side rails 142 which may be rigidly joined at their forward ends by the cross bar 143 and an intermediate rigid cross bar 144. Each conveyor side rail is welded or otherwise rigidly connected to the top surface 114 of the cross beam 104 as illustrated in FIG. 14. The conveyor frame thus pivots from the horizontal to the vertical position along with rails 123 and 124. The rear end of the conveyor side rails 142 extend coextensively with the bale engaging beams 106 so as to underlie a substantial portion of a bottom bale 134 in a vertical stack as indicated in FIGS. 12 and 13. The longitudinal conveyor is an endless chain type conveyor having laterally spaced lug chains 146 extending along the inside surfaces of the side rails 142. Each chain 146 is trained about a respective drive sprocket carried by a rotatable cross shaft 147 having its ends journaled for rotation by suitable bearings 148 mounted in the rail 142. The opposite ends of the lug chains 146 may be trained about suitable idler sprockets 149 carried at the opposite ends of the associated side rails. The lug chains 146 are driven by means of a rotary hydraulic motor 151 mounted on the cross beam 104 through drive gears 152 and 153 carried by the motor 151 and the drive shaft 147 respectively. Flexible hydraulic lines 154 and 156 will allow for relative movement between motor 151 and the truck bed.

The cross bed conveyor 108 comprises an endless chain 157 extending substantially the width of the truck bed 103 at the forward end thereof. The chain 157 may be driven by any suitable means such as a hydraulic or electric motor 158 located beneath the bed surface with the chain 157 operating at or below bed surface level so as to avoid any obstruction for the movement of bales thereover. The chain 157 mounts an upstanding paddle or pusher plate 159 attached to a lug plate pulled across the bed by the chain 157. The pusher plate may be moved the full width of the truck bed with limit switches or the like (not shown) preventing over travel. The motor 158 will be controlled from the cab or from a remote location to advance the bale in incremental motion if desired toward the edge of the truck bed for distribution. As aforementioned, the bale is moved forward and aligned by pusher bars 138 with the truck head board 161 being a backstop for the end bale.

Figure 19:
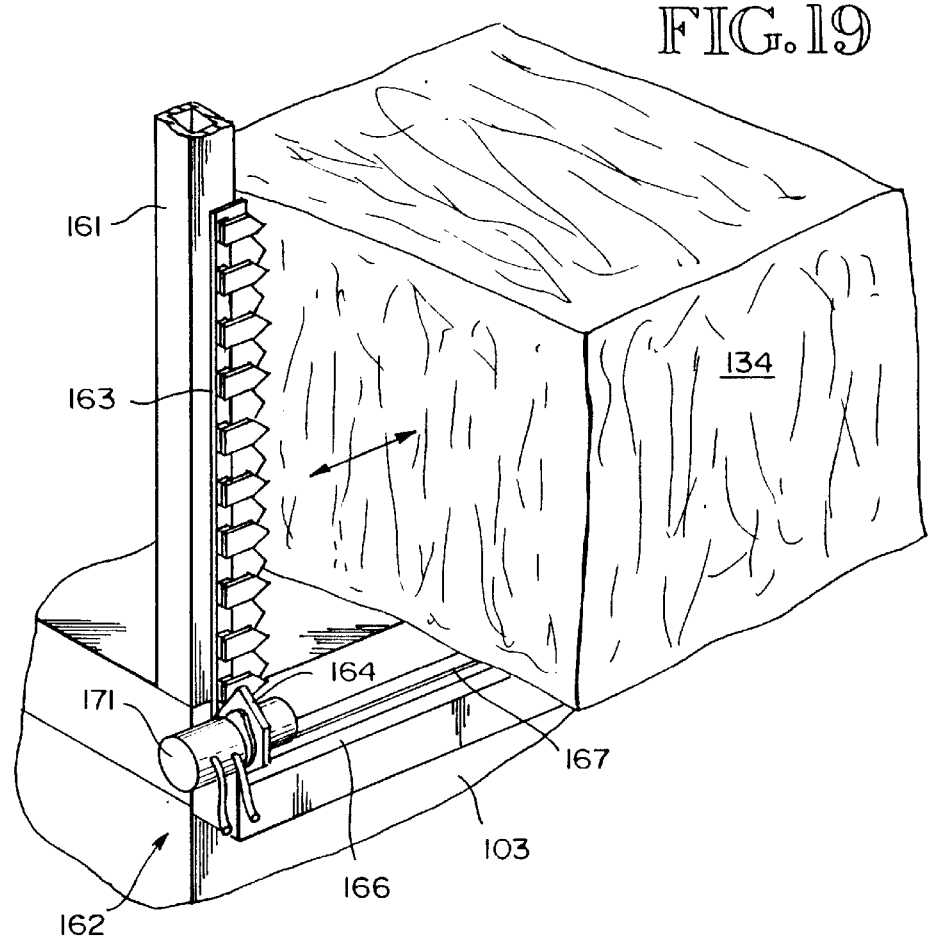
FIG. 19 is a perspective view of a sickle bar cut-off mechanism mounted on a truck bed.

According to the preferred embodiment, a sickle-bar bale cut-off device, indicated generally at 162, is located on the discharge side of the truck bed adjacent the headboard 161. The cut-off device, illustrated in detail in FIG. 19, includes an upstanding conventional sickle-bar 163 having reciprocating cutter teeth designed to cut through the end of a protruding hay bale. The sickle-bar 163 is mounted on a traveling base or support block 164 which is guided for longitudinal movement in the direction of the arrows in FIG. 19 by means of the channel iron 166 fixed to the side edge of the bed 103 and provided with a guide slot 167 in its upper surface. The base block 164 is connected for reciprocation by the piston rod 168 of the hydraulic cylinder 169 so as to advance and retract the sickle-bar across the bale end. The cylinder 169 may be mounted in fixed position on the side edge of the bed 103. The sickle-bar 163 may be powered by a remotely controlled hydraulic motor 171 in a well known manner. Since hay bale 134 as shown in FIG. 19 will normally flake off in regular increments as it is advanced over the edge of the truck bed, the sickle-bar cut-off device 162 will only be necessary in those cases when, for some reason such as freezing temperatures, the bale does not normally separate into flakes. The operator of the vehicle may observe the bale through the truck rearview mirror and simply operate the sickle-bar cut-off when necessary.

FIGS. 16–18 illustrates the normal sequence of operations involved in loading a plurality vertically stacked bales, and conveying the bales forwardly and transversely on the vehicle bed for range or pasture feeding by a single vehicle and operator. As shown in FIG. 16, the pivoted cross beam 104 will initially be operated to pivot the laterally movable rails 123, 124, longitudinal conveyor 107 and bale engaging beams 106 to the vertical position. The rails 123 and 124 may then be moved laterally outwardly to allow the tines 127 to clear the sides of the bales 134. Also the bale carrier/push arms 138 are advanced to the extended position across a substantial portion of the top bale 141. The rails 123 and 124 are then drawn inwardly by the rams 121 to cause the tines 127 to penetrate the hay bales. Once the bales are thus engaged, the cross beam 104 is rotated through approximately 90° to lower the stack of bales to the horizontal position on top of bed 103 as shown in FIG. 17. The pusher plate 159 will, of course, be located on the outside edge of the truck bed while the bales are being lowered.

With the bales in place on the truck bed, the hydraulic cylinders 137 may be actuated to withdraw the arms 138, allowing the forward most bale 141 to rest directly on the truck bed overlying the chain 157 as illustrated in FIGS. 17 and 18. The forward bale may then be moved off of the bed transversely by selective operation of the motor 158 and movement of the pusher plate 159. As previously described, once the bale ties have been removed from the bale, the hay will normally drop off in regular clumps or flakes as the bale end passes over the edge of the bed. If this does not occur, the operator actuates the hydraulic cylinder 169, and energizes the sickle-bar drive motor 171 causing the sickle-bar 163 to traverse the bale to perform the cut-off function as described. With the ability to operate the push plate 159 by selected incremental movements as the truck progresses across a field, the hay may be discharged in spaced piles ideal for cattle feeding and avoiding the waste problem experienced with unrolling a round bale. As the front bale becomes totally discharged, the pusher plate 159 will be returned to the position shown in FIG. 18 and the conveyor 107 actuated to move the next successive bale 134 to the forward position atop the cross bed conveyor. With each successive bale, each push arm 138 may be actuated independently to complete the forward movement and alignment of the successive bales.

Figure 20:
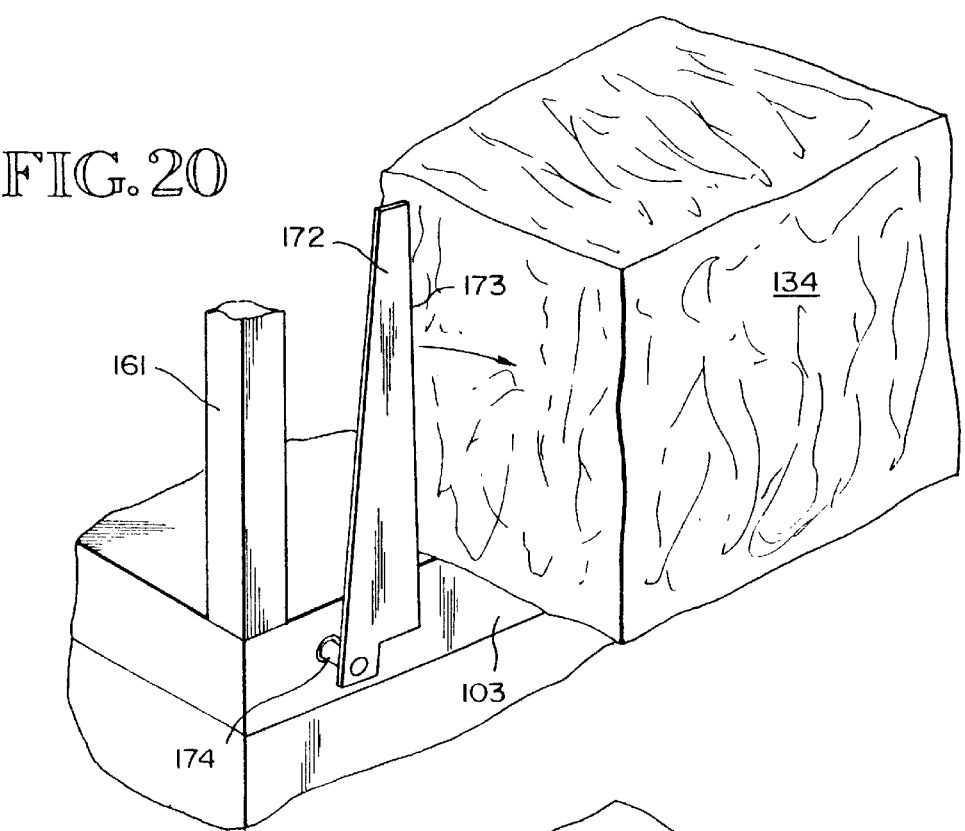
FIG. 20 is a perspective view showing a second embodiment of the cut-off mechanism utilizing a rotatable knife.

FIG. 20 illustrates a second embodiment of the bale cut-off device which comprises an upstanding rotary cut-off blade 172 mounted on the truck bed 103 at the forward end of the bed on the discharge side of the cross bed conveyor 108. The blade 172 may be of any desired configuration, normally including a forward cutting edge 173 designed to contact and remove a segment of the hay bale extending over the edge of the bed 103. The blade 172 will be mounted on a rotary shaft 174 driven by motor means (not shown) carried beneath the bed 103 in a conventional manner. The motor driven shaft 174 will rotate the knife 172 through approximately 90° arc in the direction of the arrows shown in FIG. 20 to accomplish the cut-off function. The advancement and discharge of the bale will be accomplished as previously described.

Figure 21:
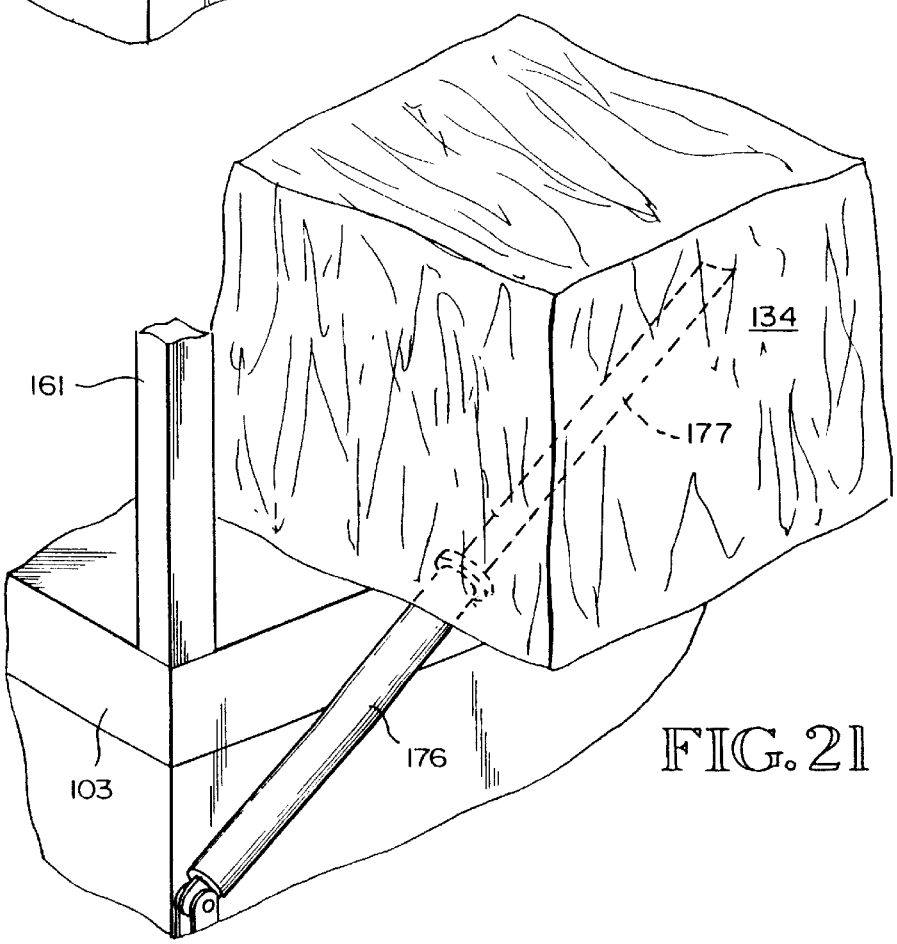
FIG. 21 is a perspective view showing a third embodiment of the cut-off mechanism utilizing a ram shear.

FIG. 21 illustrates still another embodiment of bale cut-off device in the form of a ram shear. The device comprises a hydraulic cylinder 176 mounted on the discharge side of the forward end of the truck bed. The ram 176 may be mounted at an angle, the top end of the cylinder being closely adjacent the edge of the bale which has been advanced to the discharge position overhanging the truck bed. Ram 176 has a piston rod in the form of a plunger 177 directed at an approximate 450 angle. When the plunger 177 is actuated, as shown schematically in FIG. 21, the bale will be severed sufficiently to cause separation of the overhanging segment of the bale. The advancing and discharging of the bale may be otherwise accomplished as previously described.

Figure 22:
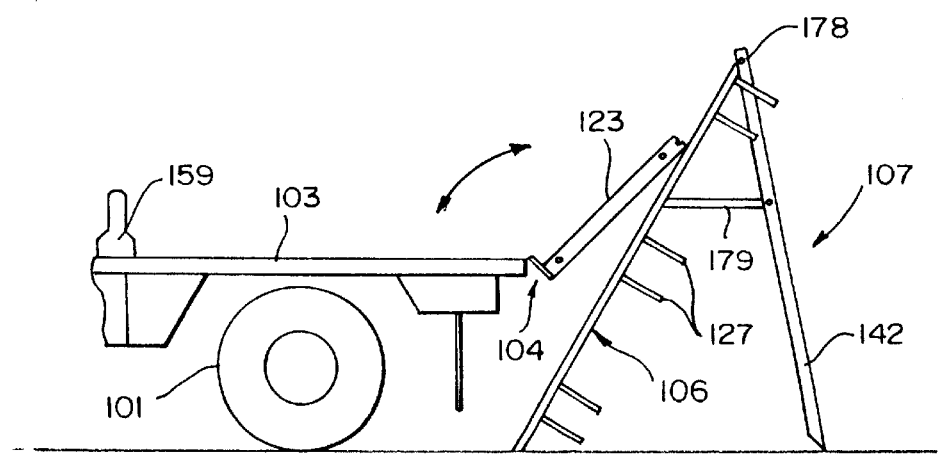
FIG. 22 is a schematic side elevational view showing the demounted conveyor and tine carrying beam members of the FIG. 11 embodiment forming an A-frame for storage.

FIG. 22 illustrates a method whereby the longitudinal conveyor frame 107 and the bale engaging beams 106 with their attached tines may be removed from the truck bed for storage purposes and to clear the bed for possible other use. With this arrangement, the procedure would be to raise the side rails 123, 124, longitudinal conveyor 107 and beams 106 to a vertical position by rotation of the cross beam 104. The forward ends of the conveyor side rails 142 and the forward ends of the beams 106 would be connected by a suitable cross bar 178 to pivotally link these members. The conveyor side rails 142 would then be disconnected from the cross bar 104, allowing the conveyor frame 107 to pivot outwardly away from the cross beam. The two beams 106 would then be disconnected from the respective rails 123 and 124 and dropped to the ground forming an A-frame as illustrated in FIG. 22. A stabilizing connector 179 would then be connected between the conveyor rails 142 and the beams 106 to stabilize the A-frame structure. The rails 123 and 124 could then be returned to the horizontal position on top of the flat bed allowing the bed to be put to an alternative use.

FIGS. 23 and 24 illustrate an embodiment of the present system designed for a large capacity flat bed vehicle capable of carrying, for instance, eight 32×48 inch bales or four eight foot long 45×50 inch bales. The embodiment shown in FIGS. 23 and 24 is designed to load and discharge six eight foot long 32×48 inch bales from the extended flat bed 181. In this embodiment, it will be understood that the bale gripping beams, laterally adjustable rails 123, 124 as well as the longitudinal conveyor 107 will function in a manner described relative to FIGS. 11–18 embodiment and will all be connected to a cross beam 104a pivotally connected to the rear end of the truck bed 181. The bale engaging beams are designated at 106*a* in FIGS. 23 and 24 with the tines being indicated at 127*a*. The tine placement will be according to the discussion of the previous embodiment. Likewise carrier/pusher arms 138*a* will be connected to the beams 106*a* in a manner previously described. In this embodiment, the longitudinal conveyor, laterally movable rails 123,124 and the beams 106*a* are raised and lowered about a horizontal axis provided by cross bar 104*a* by means of a compound hydraulic ram 182 as shown which is pivotally connected between the conveyor and beam frame and the chassis or bed 181 of the truck. As indicated, the ram 182 will move the frame from the horizontal position shown in FIG. 23 to the bale pickup position shown in FIG. 24 and return the bales to the bed of the truck with the forward most bale 183 positioned on a cross bed conveyor as previously described. The carrier/push arms 138*a* and the cross bed conveyor will function in the same manner described relative to the previous embodiments. In addition to the hay bale loading and unloading system, provision may be made for mounting a grain feeder above the truck bed, indicated schematically at 184, to feed grain simultaneously with the discharged hay.

FIGS. 25 and 26 illustrate another embodiment of the invention wherein a unitary frame structure 186 may be assembled to include a central longitudinal conveyor, laterally movable side rails and bale engaging beams in the manner described for the FIGS. 23, 24 embodiment including carrier/push arms 138*b* for attachment to a smaller size wheeled vehicle. In this embodiment the frame 186 may be removed and mounted on an alternative vehicle such as front end loader. The frame 186 in the embodiment of FIG. 25 is raised and lowered by a separate hydraulic ram 187 pivotally connected between the truck chassis and the frame as described relative to the FIGS. 23,24 embodiment. In the alternative, as shown in FIG. 26, the frame 186 may be mounted on a rotatable cross beam 104*b* as described relative to the FIGS. 11–18 embodiment.

While the preferred embodiments of the invention have been described herein it is to be understood that the foregoing description and accompanying drawings have been given by way of illustration and example. Variations in design and arrangement of parts may be made without departure from the scope and spirit of the present invention. For example, electrical or pneumatic motor means or manual operated means may be substituted for the various hydraulic motor means described or a combination of electrical, pneumatic, hydraulic motor means and manual operation may be utilized to perform the various operations described. Similarly, in its broadest scope, the invention also contemplates structural modifications whereby the longitudinal conveyor may be maintained in the horizontal position while the bale stack is being engaged and moved to the horizontal position. Likewise, the present invention is not intended to be limited to any particular type of motor vehicle, trailer, or other conveyance. Changes in form of the several parts, substitution of equivalent elements and arrangement of parts which will be readily apparent to one skilled in the art, are also contemplated as within the scope of the present invention, which is to be limited only by the claims which follow.

What is claimed is:

1. Apparatus for use with a transport vehicle to load, transfer, and unload bales, said vehicle including a vehicle support frame, said apparatus comprising;
    a longitudinally extending conveyor system supported on said frame for moving bales longitudinally on said vehicle,
    a bale engaging tine structure supported on said frame and located along the extent of said longitudinally extending conveyor system on both sides thereof,
    each said tine structure including a plurality of bale engaging tines spaced along the extent of said longitudinally extending conveyor system and movable between a retracted position and a bale engaging position,
    means for selectively moving said tine structures between a horizontal position on said vehicle support frame and a vertical bale stack engaging position, and
    means for selectively moving said tines between the retracted position and the bale engaging position,
    whereby said tine structures may be moved to a substantially vertical position against a stack of a plurality of bales, said tines then moved into engagement with the bales to secure the bales, the bales then moved to a horizontal position and the tines retracted, allowing said bales to be conveyed longitudinally by said conveyor system.

2. The apparatus of claim 1 wherein said longitudinally extending conveyor system has a forward and aft end relative to the direction of forward and reverse travel respectively of said support frame, said apparatus further including;
    a transverse conveyor system located adjacent the forward end of said longitudinally extending conveyor system and adapted and arranged to receive bales advanced thereon by said longitudinally extending conveyor system, and
    means to selectively operate said transverse conveyor system to incrementally discharge the bales laterally from a discharge end thereof to one side of said vehicle while the vehicle moves in a forward direction to distribute material from the bale in spaced piles.

3. The apparatus of claim 2 including;
    a bale cut-off mechanism carried by said vehicle support frame adjacent the discharge end of said transverse conveyor system,
    said cut-off mechanism having a separator member for contacting a bale being discharged to ensure incremental separation thereof during discharge to form said spaced piles.

4. The apparatus of claim 3 wherein said separator member comprises a motor driven sickle-bar.

5. The apparatus of claim 3 wherein said separator member comprises a motor driven rotary cut-off blade.

6. The apparatus of claim 3 wherein said separator member comprises a fluid pressure driven ram shear member.

7. The apparatus of claim 2 wherein said support frame comprises a vehicle chassis and further including;
    a flatbed support structure pivotally mounted on said chassis for movement between a horizontal and substantially vertical position;
    said longitudinally extending conveyor system, said transverse conveyor system and said tine structures being mounted on said flatbed support structure for movement therewith between the horizontal and vertical positions.

8. The apparatus of claim 7 wherein; said flatbed support structure has a top load supporting surface,
    said longitudinally extending conveyor system, said transverse conveyor system and said tine structures are mounted beneath said top load supporting surface, and
    openings in said flatbed support structure are constructed and arranged to allow bales resting on said load supporting surface to be contacted by said longitudinally extending and by said transverse conveyor systems and to allow passage of said bale engaging tines during movement from the retracted to the bale engaging position.

9. The apparatus of claim 8 wherein said tine structures comprise;
- parallel rotary tine shafts positioned on each side of said longitudinally extending conveyor system,
- motor means for selectively rotating said shafts, and
- mounting structures for connecting said tines to the tine shafts,
- whereby said tines are moved through an arcuate path between the retracted position and the bale engaging position.

10. The apparatus of claim 2 wherein, said support frame includes a flatbed support structure having an aft end;
- a longitudinal conveyor frame having an aft end cross beam pivotally connected to the aft end of said flatbed support structure for moving said conveyor frame between a horizontal position resting on said flatbed support structure and a substantially vertical position,
- said longitudinally extending conveyor system being carried by said conveyor frame for movement therewith,
- said tine structures being connected to said aft end cross beam for movement with said conveyor frame, and
- motor means for selectively rotating said aft end cross beam to move said conveyor frame and said tine structures between the horizontal and vertical positions;
- said transverse conveyor system being mounted on said flatbed support structure.

11. The apparatus of claim 10 wherein said tine structures are mounted for lateral movement between the retracted position and the bale engaging position.

12. Apparatus for use with a transport vehicle to load, transfer, and unload large bales of a size generally incapable of being handled and maneuvered by a single person, said vehicle including a vehicle support frame, said apparatus comprising;
- a flatbed support structure having a top load supporting surface, a forward and an aft end, said aft end being pivotally connected to said vehicle support frame for movement of said flatbed support structure between a horizontal hauling position and a generally vertical bale stack engaging position,
- motor means for selectively moving said flatbed support structure between the horizontal and vertical positions,
- a longitudinal conveyor system carried by said flatbed support structure and extending over a major portion thereof and located beneath the top load supporting surface,
- motor means for selectively operating said longitudinal conveyor system,
- bale engaging tine structures carried on said flatbed support structure beneath said top load supporting surface, said tine structures including a rotatable tine supporting shaft extending along each side of said longitudinal conveyor system,
- said tine structures including bale engaging tines spaced along each said tine supporting shaft and movable between a retracted position and a bale engaging position upon rotation of said shafts,
- motor means for selectively rotating said tine supporting shafts; and
- openings in said flatbed support structure constructed and arranged to expose said longitudinal conveyor system and to allow passage of said bale engaging tines during movement between the retracted and bale engaging positions.

13. The apparatus of claim 12 including;
- a cross-bed conveyor system located adjacent the forward end of said longitudinal conveyor system extending the major width of said flatbed support structure and located beneath the top load supporting surface thereof, and
- motor means for selectively operating said cross-bed conveyor system.

14. The apparatus of claim 13 wherein said longitudinal conveyor system includes a drive shaft located adjacent the aft end of said flatbed support structure, said apparatus further including a conveyor and tine structure extension comprising;
- an extension frame mounted for free rotation on said drive shaft and normally disposed in a vertical position,
- a longitudinal conveyor extension carried by said extension frame and drivingly connected for rotation by said drive shaft,
- tine mounting shaft extensions rotatably carried on said extension frame in alignment with said tine mounting shafts when said flatbed support structure is in the vertical position,
- a plurality of bale engaging tines fixed to each said shaft extension,
- first coupling means for rigidly connecting said extension frame to said flatbed support structure, and
- second coupling means for connecting said tine mounting shafts to said tine shaft extensions for rotation therewith.

15. The apparatus of claim 14 wherein said longitudinal conveyor system and said cross-bed conveyor systems comprise endless conveyors having spaced conveyor chains.

16. The apparatus of claim 13 including:
- bale cut-off mechanism carried by said flatbed support structure adjacent the discharge end of said cross-bed conveyor,
- said cut-off mechanism having a separator for contacting a bale being discharged to ensure incremental separation thereof during discharge, and
- motor means for selectively actuating said cut-off mechanism to form spaced piles as the vehicle moves forward.

17. Apparatus for use with a transport vehicle to load, transfer, and unload large bales of a size generally incapable of being handled and maneuvered by a single person, said vehicle including a flatbed support with a forward and aft end, said apparatus comprising;
- a longitudinal conveyor frame having an aft end cross beam pivotally connected to the aft end of said flatbed support for moving said conveyor frame between a horizontal position resting on said flatbed support and a substantially vertical bale stack engaging position,
- motor means for selectively rotating said aft end cross beam to move the frame between the horizontal and vertical positions,
- a longitudinal conveyor system mounted on said frame and extending the major longitudinal extent of said flatbed support,
- motor means for selectively actuating said longitudinal conveyor system, a longitudinally extending tine beams located on each side of said longitudinal conveyor system and having their aft ends connected for rotation with said aft end cross beam, motor means carried by said aft end cross beam for laterally moving said tine beams relative to said longitudinal conveyor frame between a retracted position and a bale engaging position, and a plurality of spaced tines connected to each said tine beam for engaging and holding a plurality of bales against said conveyor frame during movement of the frame to the horizontal position.

18. The apparatus of claim 17 including;

a cross-bed conveyor system mounted on said flatbed support and located adjacent the forward end of said longitudinal conveyor frame and adapted and arranged to receive bales advanced thereon by said longitudinal conveyor system, and motor means to selectively operate said cross-bed conveyor system to incrementally discharge a bale carried thereon laterally from a discharge end thereof to one side of said vehicle while the vehicle moves in a forward direction to distribute material from said bale in spaced piles.

19. The apparatus of claim 18 wherein said longitudinal and said cross-bed conveyor systems are endless conveyors having spaced conveyor chains.

20. The apparatus of claim 19 including extensible pusher arms mounted adjacent said tine beams for engaging a bale at an elevation above said conveyor frame when in the vertical position, said pusher arms being extensible and retractable for positioning bales on said flatbed support over said cross-bed conveyor system, and motor means for selectively extending and retracting said pusher arms.

21. The apparatus of claim 20 including;

bale cut-off mechanism carried by said flatbed support adjacent the discharge end of said cross-bed conveyor system, said cut-off mechanism having a separator for contacting a bale being discharged to ensure incremental separation thereof during discharge, and motor means for selectively actuating said cut-off means to form spaced piles as the vehicle moves forward.

22. Apparatus for use with a transport vehicle to load, transfer, and unload bales, said vehicle including a vehicle support frame, said apparatus comprising;

a longitudinally extending conveyor system supported on said frame for moving bales longitudinally on said vehicle, a bale engaging structure supported on said frame and located along the extent of said longitudinally extending conveyor system on both sides thereof, each said bale engaging structure being movable between a retracted position and a bale engaging position, means for selectively moving said bale engaging structures between a horizontal position on said vehicle support frame and a vertical bale stack engaging position, and means for selectively moving each said bale engaging structure between the retracted position, and the bale engaging position, whereby said bale engaging structures may be moved to a substantially vertical position against a stack of bales, said bale engaging structures then moved into engagement with the bales to secure the bales, the bales then moved to a horizontal position and the bale engaging structures retracted, allowing said bales to be conveyed longitudinally by said longitudinally extending conveyor system.

23. The apparatus of claim 22 wherein said bale engaging structures include bale engaging tine members for contacting said bales in the bale engaging position.

24. The apparatus of claim 23 wherein a plurality of said tine members are spaced along the extent of said longitudinally extending conveyor system on both sides thereof.

* * * * *

UNITED STATES PATENT AND TRADEMARK OFFICE
CERTIFICATE OF CORRECTION

PATENT NO. : 6,328,520 B1
DATED : December 11, 2001
INVENTOR(S) : Thomas B. Maclay It is certified that error appears in the above-identified patent and that said Letters Patent is hereby corrected as shown below:

Column 17,
Line 1, change "beams" to -- beam --.

Column 18,
Line 24, cancel the comma "," after -- position --.

Signed and Sealed this

Fourth Day of June, 2002

Attest:

JAMES E. ROGAN
Attesting Officer  Director of the United States Patent and Trademark Office